(12) United States Patent
Coury et al.

(10) Patent No.: US 7,984,012 B2
(45) Date of Patent: Jul. 19, 2011

(54) GRAPH EMBEDDING TECHNIQUES

(75) Inventors: Michael Coury, Vancouver (CA); William G. Macready, West Vancouver (CA); David Grant, Vancouver (CA)

(73) Assignee: D-Wave Systems Inc., Burnaby (CA)

( * ) Notice: Subject to any disclaimer, the term of this patent is extended or adjusted under 35 U.S.C. 154(b) by 930 days.

(21) Appl. No.: 11/932,248

(22) Filed: Oct. 31, 2007

(65) Prior Publication Data

US 2008/0218519 A1 Sep. 11, 2008

Related U.S. Application Data

(60) Provisional application No. 60/864,129, filed on Nov. 2, 2006.

(51) Int. Cl.
*G06F 15/00* (2006.01)
*G06F 15/18* (2006.01)

(52) U.S. Cl. ........................................................ 706/62

(58) Field of Classification Search ................... 706/62
See application file for complete search history.

(56) References Cited

U.S. PATENT DOCUMENTS

| | | | |
|---|---|---|---|
| 6,838,694 B2 | 1/2005 | Esteve et al. | 257/34 |
| 7,135,701 B2 | 11/2006 | Amin et al. | 257/31 |
| 2005/0082519 A1 | 4/2005 | Amin et al. | 257/13 |
| 2005/0250651 A1 | 11/2005 | Amin et al. | 505/846 |
| 2005/0256007 A1 | 11/2005 | Amin et al. | 505/170 |
| 2006/0147154 A1 | 7/2006 | Thom et al. | 385/37 |

OTHER PUBLICATIONS

'GraphGrep: A Fast and Universal Method for Querying Graphs': Giugno, 2002, IEEE, 1051-4651, pp. 112-115.*
Coury M. Embedding Graphs into the Extended Grid. School of Computing Science, Simon Fraser University, Feb. 7, 2008 [retrieved on Nov. 22, 2010]. Retrieved from the Internet<http://arxiv.org/PS_cache/cs/pdf/0703/0703001v1.pdf.*
"A High-Level Look at Optimization: Past, Present and Future," e-Optimization.Community, May 2000, pp. 1-5.
Allen et al., "Blue Gene: A vision for protein science using a petaflop supercomputer," *IBM. Systems Journal* 40(2): 310-327, 2001.
Blatter et al., "Design aspects of superconducting-phase quantum bits," *Physical Review B* 63: 174511-1-174511-9, 2001.
Boyer et al., "On the Cutting Edge: Simplified O(n) Planarity by Edge Addition," *Journal of Graph Algorithms and Applications* 8(3): 241-273, 2004.
Dolan et al., "Optimization on the NEOS Server," from *Siam News* 35(6): 1-5, Jul./Aug. 2002.
Farhi et al., "Quantum Adiabatic Evolution Algorithms versus Simulated Annealing," MIT-CTP #3228, arXiv:quant-ph/0201031 v1, pp. 1-16, Jan. 8, 2002.
Feynman, "Simulating Physics with Computers," *International Journal of Theoretical Physics* 21(6/7): 467-488, 1982.
Fourer et al., "Optimization as an Internet Resource," *Interfaces* 31(2): 130-150, Mar.-Apr. 2001.
Friedman et al., "Quantum superposition of distinct macroscopic states," *Nature* 406: 43-46, Jul. 6, 2000.
U.S. Appl. No. 11/932,261, filed Oct. 31, 2007, Macready et al.

(Continued)

*Primary Examiner* — Jeffrey A Gaffin
*Assistant Examiner* — Peter Coughlan
(74) *Attorney, Agent, or Firm* — Seed IP Law Group PLLC

(57) ABSTRACT

Approaches to embedding source graphs into targets graphs in a computing system are disclosed. Such may be advantageously facilitate computation with computing systems that employ one or more analog processors, for example one or more quantum processors.

19 Claims, 10 Drawing Sheets

OTHER PUBLICATIONS

U.S. Appl. No. 12/017,995, filed Jan. 22, 2008, Harris.

Gutwenger et al., "Graph Drawing Algorithm Engineering with AGD," in Diehl (ed.), *Lecture Notes in Computer Science 2269. Revised Lectures on Software Visualization, International Seminar*, Springer-Verlag, London, 2001, pp. 307-323.

Heckman et al., "Optimal Embedding of Complete Binary Trees into Lines and Grids," Department of Mathematics and Computer Science, University of Paderborn, West Germany, pp. 1-11, date unknown.

Il'ichev et al., "Continuous Monitoring of Rabi Oscillations in a Josephson Flux Qubit," *Physical Review Letters 91*(9): 097906-1-097906-4, week ending Aug. 29, 2003.

Knysh et al., "Adiabatic Quantum Computing in systems with constant inter-qubit couplings," arXiv:quant-ph/0511131v2, pp. 1-10, Nov. 15, 2005.

Makhlin et al., "Quantum-state engineering with Josephson-junction devices," *Reviews of Modern Physics 73*(2): 357-400, Apr. 2001.

Mooij et al., "Josephson Persistent-Current Qubit," *Science 285*: 1036-1039, Aug. 13, 1999.

Mutzel, "Optimization in graph drawing," Technische Universität Wien, pp. 1-20, 2002.

Nielsen et al., *Quantum Computation and Quantum Information*, Cambridge University Press, Cambridge, 2000, "7.8 Other implementation schemes," pp. 343-345.

Orlando et al., "Superconducting persistent-current qubit," *Physical Review B 60*(22): 15 398-15 413, Dec. 1, 1999.

Shields, Jr. et al., "Area Efficient Layouts of Binary Trees on One, Two Layers," Department of Computer Science, University of Texas at Dallas, 13 pages, date unknown.

Shirts et al., "Computing: Screen Savers of the Word Unite!," *Science Online 290*(5498): 1903-1904, Dec. 8, 2000.

Shor, "Introduction to Quantum Algorithms," AT&T Labs—Research, arXiv:quant-ph/0005003 v2, pp. 1-17, Jul. 6, 2001.

* cited by examiner

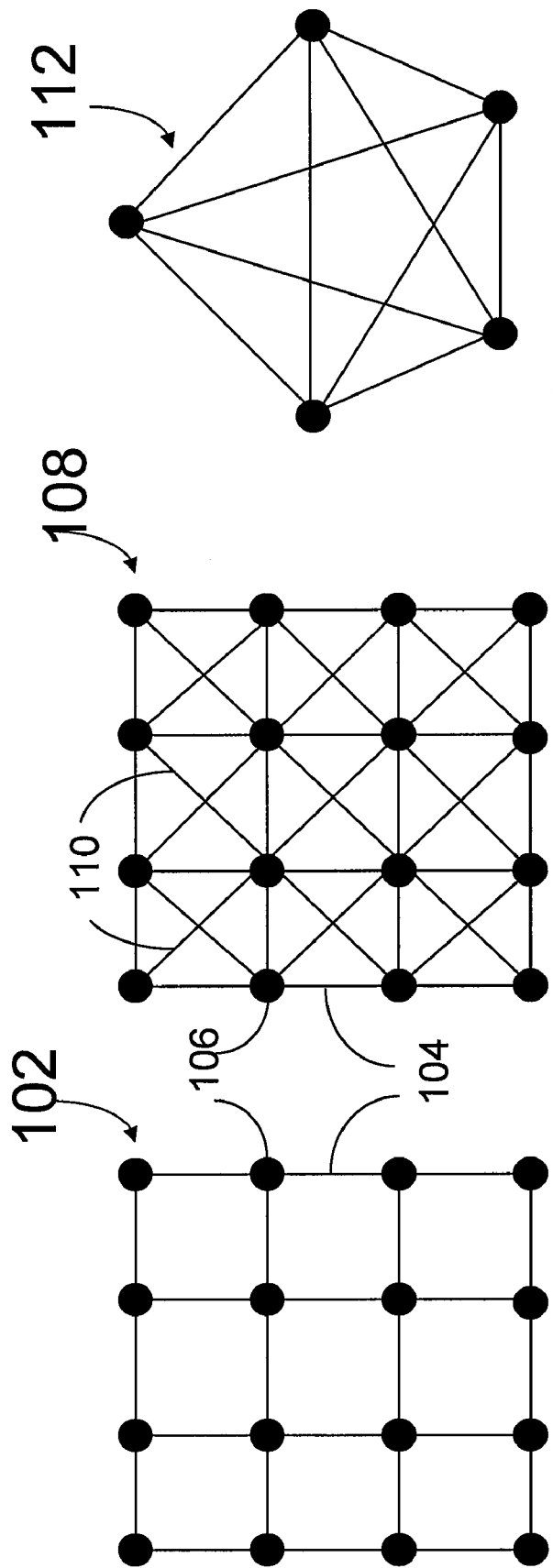

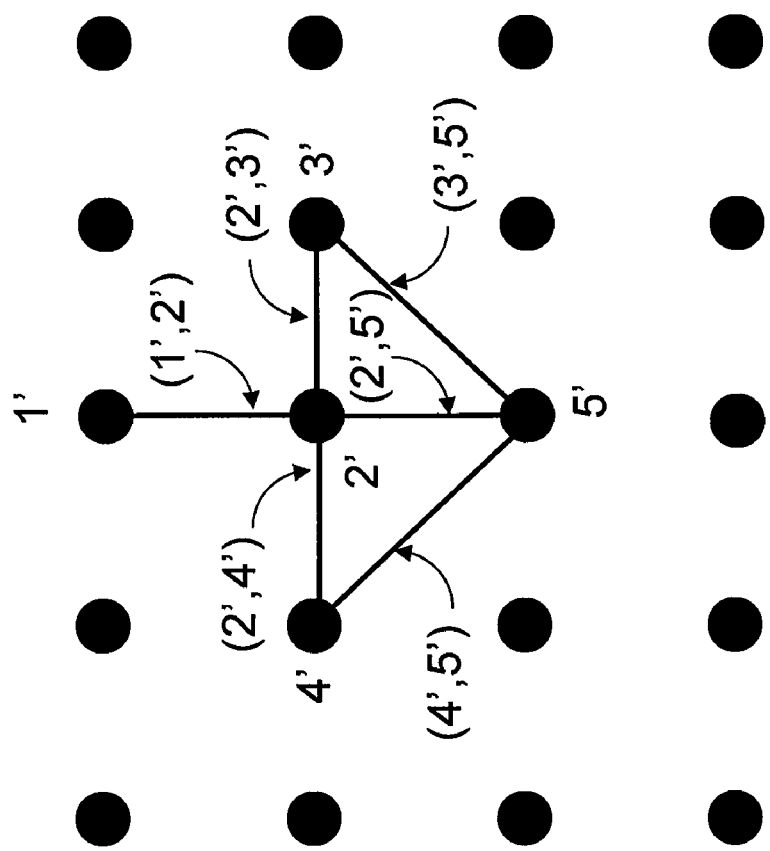

GRAPH EMBEDDING TECHNIQUES

CROSS-REFERENCES TO RELATED APPLICATIONS

This application claims priority under 35 U.S.C. §119(e) from U.S. Provisional Patent Application Ser. No. 60/864,129, filed Nov. 2, 2006, which is incorporated herein by reference in its entirety.

FIELD OF THE INVENTION

The present systems, methods and apparatus relate to graph embedding techniques, and specifically, to the embedding of undirected, weighted and unweighted graphs.

BACKGROUND

A Turing machine is a theoretical computing system, described in 1936 by Alan Turing. A Turing machine that can efficiently simulate any other Turing machine is called a Universal Turing Machine (UTM). The Church-Turing thesis states that any practical computing model has either the equivalent or a subset of the capabilities of a UTM.

A quantum computer is any physical system that harnesses one or more quantum effects to perform a computation. A quantum computer that can efficiently simulate any other quantum computer is called a Universal Quantum Computer (UQC).

In 1981 Richard P. Feynman proposed that quantum computers could be used to solve certain computational problems more efficiently than a UTM and therefore invalidate the Church-Turing thesis. See e.g., Feynman R. P., "Simulating Physics with Computers", International Journal of Theoretical Physics, Vol. 21 (1982) pp. 467-488. For example, Feynman noted that a quantum computer could be used to simulate certain other quantum systems, allowing exponentially faster calculation of certain properties of the simulated quantum system than is possible using a UTM.

Approaches to Quantum Computation

There are several general approaches to the design and operation of quantum computers. One such approach is the "circuit model" of quantum computation. In this approach, qubits are acted upon by sequences of logical gates that are the compiled representation of an algorithm. Circuit model quantum computers have several serious barriers to practical implementation. In the circuit model, it is required that qubits remain coherent over time periods much longer than the single-gate time. This requirement arises because circuit model quantum computers require operations that are collectively called quantum error correction in order to operate. Quantum error correction cannot be performed without the circuit model quantum computer's qubits being capable of maintaining quantum coherence over time periods on the order of 1,000 times the single-gate time. Much research has been focused on developing qubits with coherence sufficient to form the basic information units of circuit model quantum computers. See e.g., Shor, P. W. "Introduction to Quantum Algorithms", arXiv.org:quant-ph/0005003 (2001), pp. 1-27. The art is still hampered by an inability to increase the coherence of qubits to acceptable levels for designing and operating practical circuit model quantum computers.

Another approach to quantum computation, involves using the natural physical evolution of a system of coupled quantum systems as a computational system. This approach does not make critical use of quantum gates and circuits. Instead, starting from a known initial Hamiltonian, it relies upon the guided physical evolution of a system of coupled quantum systems wherein the problem to be solved has been encoded in the terms of the system's Hamiltonian, so that the final state of the system of coupled quantum systems contains information relating to the answer to the problem to be solved. This approach does not require long qubit coherence times. Examples of this type of approach include adiabatic quantum computation, cluster-state quantum computation, one-way quantum computation, quantum annealing and classical annealing, and are described, for example, in Farhi, E. et al. "Quantum Adiabatic Evolution Algorithms versus Simulated Annealing", arXiv.org:quant-ph/0201031 (2002), pp 1-16.

Qubits

As mentioned previously, qubits can be used as fundamental units of information for a quantum computer. As with bits in UTMs, qubits can refer to at least two distinct quantities; a qubit can refer to the actual physical device in which information is stored, and it can also refer to the unit of information itself, abstracted away from its physical device.

Qubits generalize the concept of a classical digital bit. A classical information storage device can encode two discrete states, typically labeled "0" and "1". Physically these two discrete states are represented by two different and distinguishable physical states of the classical information storage device, such as direction or magnitude of magnetic field, current, or voltage, where the quantity encoding the bit state behaves according to the laws of classical physics. A qubit also contains two discrete physical states, which can also be labeled "0" and "1". Physically these two discrete states are represented by two different and distinguishable physical states of the quantum information storage device, such as direction or magnitude of magnetic field, current, or voltage, where the quantity encoding the bit state behaves according to the laws of quantum physics. If the physical quantity that stores these states behaves quantum mechanically, the device can additionally be placed in a superposition of 0 and 1. That is, the qubit can exist in both a "0" and "1" state at the same time, and so can perform a computation on both states simultaneously. In general, N qubits can be in a superposition of $2^N$ states. Quantum algorithms make use of the superposition property to speed up some computations.

In standard notation, the basis states of a qubit are referred to as the $|0\rangle$ and $|1\rangle$ states. During quantum computation, the state of a qubit, in general, is a superposition of basis states so that the qubit has a nonzero probability of occupying the $|0\rangle$ basis state and a simultaneous nonzero probability of occupying the $|1\rangle$ basis state. Mathematically, a superposition of basis states means that the overall state of the qubit, which is denoted $|\Psi\rangle$, has the form $|\Psi\rangle=a|0\rangle+b|1\rangle$, where a and b are coefficients corresponding to the probabilities $|a|^2$ and $|b|^2$, respectively. The coefficients a and b each have real and imaginary components, which allows the phase of the qubit to be characterized. The quantum nature of a qubit is largely derived from its ability to exist in a coherent superposition of basis states and for the state of the qubit to have a phase. A qubit will retain this ability to exist as a coherent superposition of basis states when the qubit is sufficiently isolated from sources of decoherence.

To complete a computation using a qubit, the state of the qubit is measured (i.e., read out). Typically, when a measurement of the qubit is performed, the quantum nature of the qubit is temporarily lost and the superposition of basis states collapses to either the $|0\rangle$ basis state or the $|1\rangle$ basis state and thus regaining its similarity to a conventional bit. The actual state of the qubit after it has collapsed depends on the probabilities $|a|^2$ and $|b|^2$ immediately prior to the readout operation.

Superconducting Qubits

There are many different hardware and software approaches under consideration for use in quantum computers. One hardware approach uses integrated circuits formed of superconducting materials, such as aluminum or niobium. The technologies and processes involved in designing and fabricating superconducting integrated circuits are similar to those used for conventional integrated circuits.

Superconducting qubits are a type of superconducting device that can be included in a superconducting integrated circuit. Superconducting qubits can be separated into several categories depending on the physical property used to encode information. For example, they may be separated into charge, flux and phase devices, as discussed in, for example Makhlin et al., 2001, *Reviews of Modern Physics* 73, pp. 357-400. Charge devices store and manipulate information in the charge states of the device, where elementary charges consist of pairs of electrons called Cooper pairs. A Cooper pair has a charge of 2e and consists of two electrons bound together by, for example, a phonon interaction. See e.g., Nielsen and Chuang, *Quantum Computation and Quantum Information*, Cambridge University Press, Cambridge (2000), pp. 343-345. Flux devices store information in a variable related to the magnetic flux through some part of the device. Phase devices store information in a variable related to the difference in superconducting phase between two regions of the phase device. Recently, hybrid devices using two or more of charge, flux and phase degrees of freedom have been developed. See e.g., U.S. Pat. No. 6,838,694 and U.S. patent application Ser. No. 2005-0082519.

Graph Theory

Graphs are an effective way of representing relationships among entities, and are very common in all areas of modern life, including economics, mathematics, natural sciences and social sciences. While some graphs are simply used as a visual aid, others can be used to represent a problem to be solved. In fact, mapping a problem into graph format can sometimes help solve the problem. Instances of such problems can include stock portfolio selection, microwave tower placement, delivery route optimization and other large-scale problems. Two types of problems for which graphs are commonly used are optimization problems and decision problems.

A decision problem is a problem for which there exists a yes or no answer. For example, in the Traveling Salesman Problem ("TSP"), it must be determined whether, given a list of locations, a travel route that visits all locations in the list exactly once exists such that the total distance traveled by the salesman is less than a predetermined distance. Optimization problems are problems for which, given a set of constraints, one or more variables are either maximized or minimized. For example, in the optimization version of the TSP, an optimized travel itinerary must be determined, by minimizing a variable, such as distance or cost, e.g., given a list of locations, the shortest route that visits all locations exactly once must be found. For a large list of locations, problems become complex and require exponentially many computations in order to find the solution in the worst case.

Other examples of problems for which graphs may be helpful include maximum independent set, constraint optimization, factoring, prediction modeling and k-SAT. These problems are abstractions of many real-world problems, such as those found in operations research, financial portfolio selection, scheduling, supply management, circuit design and travel route selection.

Graphs are also used in the field of very large scale integration (VLSI) chip design. Given an electronic circuit with many different elements that need to be wired together in a limited space and with specific design rules to be followed, finding an efficient wiring scheme can be done using graphs. Examples of applying graphical techniques to VLSI design can be found in Shields et al., 2001, *Parallel and Distributed Computing and Systems Conference*, Anaheim, Calif.; and Heckmann et al. 1991, Proc. $17^{th}$ Int. Workshop on Graph-Theoretic Concepts in Comp. Sci., pp. 25-35.

In some situations, it may be desirable to transform one graph to another such as by embedding a first (source) graph into a second (target) graph. In the present context, graph embedding may be defined as a particular drawing of a source graph or a collection of vertices and edges connecting some subset of the vertices. Graph drawing applies topology and geometry to derive two- and three-dimensional representations of graphs. Graph drawing is motivated by applications such as VLSI circuit design, social network analysis, cartography and bioinformatics. There can be many permutations of, or ways to draw, a source graph; that is, the number of ways a graph can be embedded depends on the characteristics and rules of the target graph. For example, the target graph may be an infinite two-dimensional architecture with vertices placed at 90° to each other. As shown in FIG. 1A, in grid 102, edges 104 between vertices 106 may be constrained to be in two mutually orthogonal directions (e.g., up-down or left-right). In grid 102 every vertex has a degree of 4 (ignoring boundary vertices), meaning that each vertex except the boundary vertices has four edges connected to it, the edges going only in the directions mentioned above. An alternative target graph is an extended grid (EM) 108, as shown in FIG. 1B, where in addition to horizontal and vertical edges 104, edges 110 cross and extend diagonally (e.g., at 45°) between vertices 106. Every vertex of the extended grid 108 has a degree of 8 (ignoring boundary vertices). One type of graph embedding involves translating an arbitrary graph into a grid system such as grid 102 or extended grid 108.

Graphs that can be embedded can be broken into two types: planar and non-planar. Planar graphs are graphs that can be drawn on a two-dimensional plane such that no two edges intersect, while a non-planar graph is a graph where at least two edges intersect. FIG. 1A is an example of a planar graph, while graph 112 of FIG. 1C is an example of a non-planar graph (known as the complete "K5" graph). In some situations, it may be desirable to embed a planar graph onto a non-planar graph or to make a non-planar graph as planar as possible, i.e., by reducing the number of edge crossings.

One possible way of characterizing graph embeddings is their "efficiency". For some purposes, an efficiency metric may be defined as the amount of resources (e.g., vertices and edges), area, and/or path or edge lengths used to embed a source graph into a target graph. Under such a definition, an "efficient" graph embedding uses fewer resources, occupies less area, has lower average path lengths, or any combination thereof, than an "inefficient" graph embedding. Other efficiency metrics may include perimeter length, area, utilization (ratio of occupied nodes in target graph to unoccupied nodes), configuration and orientation of edges. Those of skill in the art will appreciate that many other metrics for efficiency may be chosen. Since the same graph can be embedded in more than one way, it is often desirable to find the most efficient embedding possible.

For very small planar graphs, known prior art techniques are available for finding the most efficient graph embedding. However, when the graph has a substantial number of vertices and edges, finding an optimal embedding becomes a complex task. Several techniques have been developed to optimize a graph embedding, such as the graph drawing technique developed by Gutwenger et al., 2002, Lecture Notes in Computer Science 2269, pp. 307-323. The Automated Graph Drawing (AGD) software program described in that publication is capable of mapping and compacting graphs using a variety of different techniques. However, all these techniques rely on the planarization of the original graph, which means the original graph is drawn to have as few, if any, crossings as possible. This comes at the expense of having longer edge lengths and greater surface area, since non-planar graphs are generally more compact.

Other forms of graph embedding are discussed in Mutzel, 2002, *Handbook of Applied Optimization*, Oxford University Press, New York, 2002, pp. 967-977. Mutzel describes many different methodologies for graph embedding and optimization, but again all concentrate on making the graph as planar as possible. Part of the reason Mutzel desires planarity is that it is aesthetically better. However, in instances where aesthetics is not an important aspect of graph optimization, the techniques outlined by Mutzel would not produce the most efficient graph embedding.

A square lattice is a set of points P arranged in n rows and m columns in a plane such that for all $P_i$ in P, $P_i=(x, y)$, $0 \leq x \leq n$, $0 \leq y \leq m$.

Given the above, there exists a need in the art for efficient methods, systems and apparatus for graph embedding and applications of graph embedding.

BRIEF DESCRIPTION OF THE DRAWINGS

FIGS. 1A, 1B and 1C are diagrams illustrating graphs in accordance with the prior art.

FIGS. 3A, 3B and 3C are schematic diagrams showing a graph and an outward expansion embedding of the graph in accordance with at least one illustrated embodiment of the present systems, methods and apparatus.

SUMMARY OF THE INVENTION

Figure 2B:
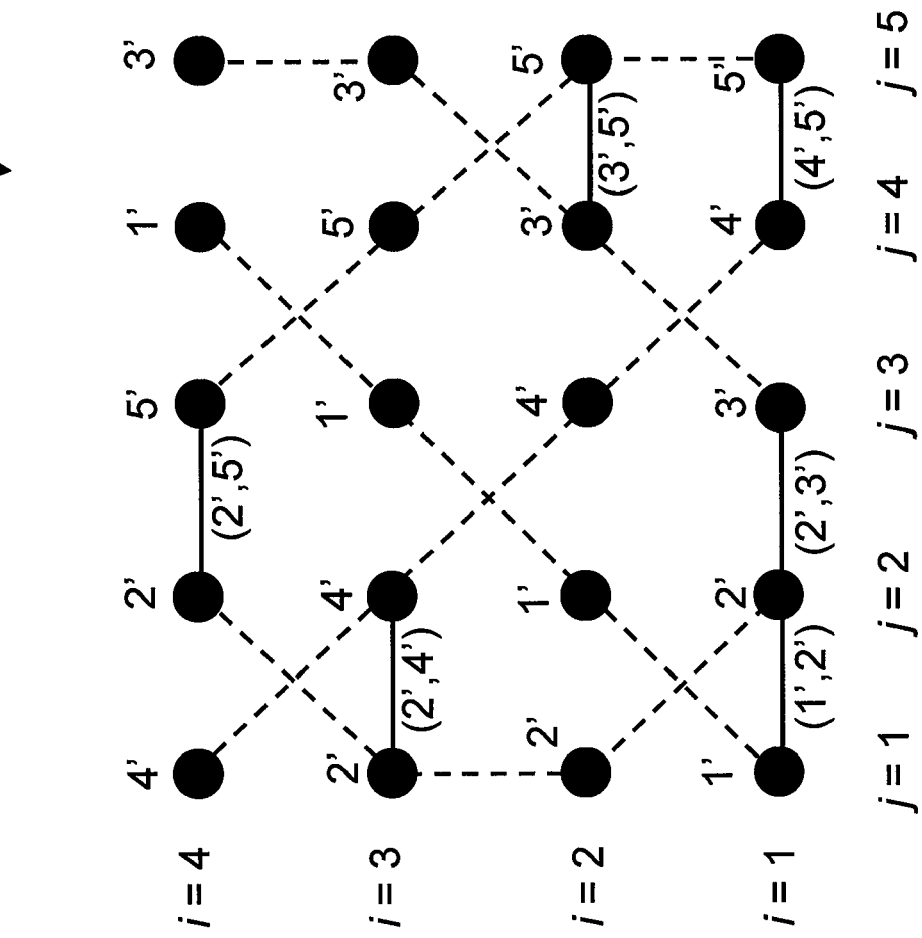
FIGS. 2A and 2B are schematic diagrams showing a graph and a braided layout embedding of the graph in accordance with at least one illustrated embodiment of the present systems, methods and apparatus.

In some embodiments, a method of embedding source graphs into target graphs in a computing system, the source graphs including a number of vertices and a number edges, wherein the edges define relationships between pairs of the vertices includes for each of at least some of a number of vertices in a source graph, forming a respective island in a target graph, the islands each comprising a connected set of vertices in the target graph of a set size at least equal to one; and for each of at least some of a number of edges in the source graph, forming an inter-island bridge in the target graph, the inter-island bridge comprising at least one inter-island edge connecting a first island in the target graph that is representative of a first vertex of the respective edge in the source graph to a second island in the target graph that is representative of a second vertex of the respective edge in the source graph.

The vertices of the source graph may be labeled. The edges of the source graph may be labeled. The vertices in each of the islands may be connected via a number of intra-island edges. The method may further include optimizing the embedding of the source graph into the target graph. Forming a respective island in a target graph may include controlling a first set of the coupling devices to couple a first set of the qubits together. The target graph may be a lattice, and forming a respective island in a target graph may include forming the respective island in the lattice, and wherein forming an inter-island bridge in the target graph includes forming the inter-island bridge in the lattice. The lattice may be a square lattice.

Forming the respective island in the lattice may include forming the respective island such that for every other one of the islands in the target graph, the respective island has at least one node adjacent to at least one node in the other one of the islands in the target graph. Vertices in each of the islands may be connected via a number of intra-island edges. At least one of the intra-island edges of a first island may intersect with at least one of the intra-island edges of a second island. At least one of the intra-island edges of a first island may intersect with an inter-island bridge. At least one of the inter-island bridges may intersect with another one of the inter-island bridges.

Forming the respective island in the lattice may include: for each vertex in the source graph selecting one node in each of a plurality of rows of the lattice to represent the vertex as one of the islands so as to maximize a total number of adjacencies between the island and the other islands, and connecting the selected nodes in the plurality of rows of the lattice with a number of intra-island edges to form the island, and wherein selecting one node in each of a plurality of rows of the lattice to represent the vertex as one of the islands includes selecting a node in a column of the lattice that is different from a column of the lattice in an immediately next row, unless the node in the immediately next row is in a column at an edge of the lattice.

Forming a respective island in the lattice may include: for each vertex in the source graph selecting one node in each of a plurality of rows of the lattice to represent the vertex as one of the islands to provide at least one adjacency between the island and each of the other islands, and connecting the selected nodes in the plurality of rows of the lattice with a number of intra-island edges to form the island, and wherein selecting one node in each of a plurality of rows of the lattice to represent the vertex as one of the islands includes selecting a node in a column of the lattice that is different from a column of the lattice in an immediately next row, unless the node in the immediately next row is in a column at an edge of the lattice.

The lattice may be formed by a network of qubits and coupling devices operable to couple respective adjacent pairs of the qubits, and wherein forming a respective island in the lattice includes: for each vertex in the source graph selecting one qubit in each of a plurality of rows of the lattice to represent the vertex as one of the islands so as to maximize a total number of adjacencies between the island and the other islands, and activating a number of coupling devices to couple the selected qubits in the plurality of rows of the lattice with a number of intra-island edges to form the island.

Selecting one qubit in each of a plurality of rows of the lattice to represent the vertex as one of the islands may include selecting a qubit in a column of the lattice that is different from a column of the lattice in an immediately next row, unless the qubit is the immediately next row is a column at an edge of the lattice. The lattice may be formed by a network of qubits and coupling devices operable to couple respective adjacent pairs of the qubits, and forming a respective island in the lattice may include for each vertex in the source graph selecting one qubit in each of a plurality of rows of the lattice to represent the vertex as one of the islands to provide at least one adjacency between the island and each of the other islands, and coupling the selected qubits in the plurality of row sot the lattice with a number of inter-island edges to form the island. Selecting one qubit in each of a plurality of rows of the lattice to represent the vertex as one of the islands may include selecting a qubit in a column of the lattice that is different from a column of the lattice in an immediately next row, unless the qubit in the immediately next row is a column at an edge of the lattice. Forming a respective island in the lattice may include: for each vertex in the source graph selecting one node in each of a plurality of rows in a respective plurality of orders along the respective row, where each of the orders differs from each of the other orders and connecting the selected nodes from each of the rows with intra-island edges to form the island.

The lattice may include a plurality of vertices and edges, the vertices arranged in a number of columns and a number of rows, and forming islands comprises: for each even-numbered column in the lattice, starting with a vertex in the column in a first row of the lattice, connecting each vertex to a next vertex in a next successive row that is in an adjacent column to the column in a first direction until a first edge of the lattice is reached, connecting to a next vertex in a next successive row in the same column when the first edge of the lattice is initially reached, and connecting each vertex to a next vertex in a next successive row that is in an adjacent column in a second direction until a second edge of the lattice is reached, to form a respective one of the islands; and for each odd numbered column in the lattice, starting with a vertex in the column in a first row of the lattice, connecting each vertex to a next vertex in a next successive row that is in an adjacent column to the column in the second direction until the second edge of the lattice is reached, connecting to a next vertex in a next successive row in the same column when the second edge of the lattice is initially reached, and connecting each vertex to a next vertex in a next successive row that is in an adjacent column in the first direction until the first edge of the lattice is reached, to form a respective one of the islands.

The method may further include determining an order for the vertices of the source graph, and wherein forming the respective island and the inter-island bridge in the lattice includes: assigning a first vertex in the lattice to represent a first one of the vertices of the source graph in the determined order; for each remaining unrepresented ones of the vertices of the source graph having an edge to the first one of the vertices of the source graph, assigning a respective vertex in the lattice to represent the respective vertex of the source graph, where the vertices in the lattice are assigned in increasing order of the number of edges between the respective vertex in the lattice and the vertex in the lattice that represents the first one of the vertices of the source graph; for each pair of vertices of the source graph for which a respective vertex in the lattice has been assigned, assigning at least one edge in the lattice that extends between the vertices in the lattice that are assigned to represent the respective pair of vertices of the source graph if the vertices in the source graph have a relationship defined between them by a respective edge of the source graph; assigning a respective vertex in the lattice to represent a second one of the vertices of the source graph which is not represented by a previously assigned one of the vertices in the lattice; for each of the remaining unrepresented ones of the vertices of the source graph having an edge to the second one of the vertices of the source graph, assigning a respective vertex in the lattice to represent the respective vertex of the source graph, where the vertices in the lattice are assigned in increasing order of the number of edges between the respective vertex in the lattice and the vertex in the lattice that represents the first one of the vertices of the source graph; and for each pair of vertices of the source graph for which a respective vertex in the lattice has been assigned, assigning at least one edge in the lattice that extends between the vertices in the lattice that are assigned to represent the respective pair of vertices of the source graph if the vertices in the source graph have a relationship defined between them by a respective edge of the source graph for which an edge in the lattice has not previously been assigned.

Determining an order for the vertices of the source graph may include at least one of ordering the source graph vertices based on a number of edges connected to each source graph vertex, randomly ordering the source graph vertices, and ordering the source graphs vertices according to an ST ordering. Assigning a first vertex in the lattice to represent a first one of the vertices of the source graph in the determined order may include at least one of assigning a first vertex in the lattice that is at least proximate to a center of the lattice to represent the first one of the vertex of the source graph in the determined order, and assigning a first vertex in the lattice that is spaced from all edges of the lattice to represent the first one of the vertices of the source graph in the determined order.

The target graph comprises a lattice assigning each source graph vertex and assigning each source graph edge may comprise: assigning a first source graph vertex to a first island in the lattice; for each subsequent source graph vertex: assigning additional target graph vertices to previously assigned islands such that for each unassigned source edge between an assigned source graph vertex and an unassigned source graph vertex, the island corresponding to the assigned source graph vertex contains at least one target graph vertex located on a perimeter of all previously assigned target graph vertices for every unassigned source edge; assigning a second source graph vertex to an island such that a bridge is available for every corresponding edge in the source graph; and assigning bridges between pairs of islands corresponding to vertices of the source graph that are connected. The source graph comprises n vertices and forming a respective island in a target graph may include forming an island comprising n−1 target graph vertices, where n is a positive integer of magnitude at least 1. The target graph may comprises n−1 rows of vertices, and forming a respective island in a target graph may include assigning the source graph vertices such that each row in the target graph contains only a single target graph vertex from any given one of the islands.

The method may include optimizing the embedding of the source graph into the target graph. Optimizing the embedding of the source graph into the target graph may include at least one of: performing a degree-K pruning, wherein K is a positive integer; disconnecting at least one vertex from at least one island; connecting at least one additional vertex to one island to extend the island; moving at least one inter-island bridge from connecting between a first pair of vertices in respective ones of two islands to connecting between a second pair of vertices in respective ones of the two islands; reducing at least one of a number of inter-island edges, intra-island edges and a number total of vertices occupied in the target graph; reducing an area occupied by the target graph; executing a path finding algorithm to optimize at least one of the assignment of the vertices, the intra-island edges and the inter-island edges; reassigning at least one vertex from a first island to a second island; assigning at least one additional vertex to an island containing a single vertex; a bias against assigning the same source graph edges to the same bridges as in a prior iteration; and a bias against assigning the same source graph edges to the same bridges as in a prior iteration.

DETAILED DESCRIPTION

In the following description, certain specific details are set forth in order to provide a thorough understanding of various embodiments of the present systems, methods and apparatus. However, one skilled in the art will understand that the present systems, methods and apparatus may be practiced without these details. In other instances, well-known structures associated with graphs, graph theory, graph drawing and graph embedding have not been shown or described in detail to avoid unnecessarily obscuring descriptions of the embodiments of the present systems, methods and apparatus. Unless the context requires otherwise, throughout the specification and claims which follow, the word "comprise" and variations thereof, such as, "comprises" and "comprising" are to be construed in an open, inclusive sense, that is, as "including, but not limited to." Unless the context requires otherwise, throughout the specification and claims that follow, the word "algorithm" is to read "algorithm or heuristic". Reference throughout this specification to "one embodiment", "an embodiment", "one alternative", "an alternative" or similar phrases means that a particular feature, structure or characteristic described is included in at least one embodiment of the present systems, methods and apparatus. Thus, the appearances of such phrases in various places throughout this specification are not necessarily all referring to the same embodiment. Furthermore, the particular features, structures, or characteristics may be combined in any suitable manner in one or more embodiments. The headings provided herein are for convenience only and do not interpret the scope or meaning of the claimed invention.

5.1 Embedding Using a Braided Layout

In order to solve a problem, it may be desirable to embed a source graph, such as a graph that represents a problem to be solved (e.g., an optimization, simulation or VLSI problem), onto a target graph. This may be done using the "braided layout" technique of the present systems, methods and apparatus.

Consider an arbitrary source graph G that contains vertices V, and edges E. In some embodiments, the braided layout technique involves assigning each vertex v of source graph G to an island (or group) of vertices $V_v'$ of a target graph G' connected by intra-island edges (also referred to herein as connectors) $E_v'$ (where a single intra-island edge within a respective island of vertices $V_v'$ is referred to as $e_v'$) and corresponding to the vertex v of the source graph, thereby producing n islands connected by bridge edges $E_{uv}'$ (also referred to herein as "bridges" or "inter-island edges" and where a single bridge between two islands is referred to as $e_{uv}'$) corresponding to the edges $E_{uv}$ in source graph G. The assignment is carried out such that a fully-connected n-vertex source graph, that is, a graph with n vertices in which each vertex is connected by edges to every other vertex, can be embedded onto the target graph.

After all vertices and edges have been assigned, in some cases it may be desirable to optimize the target graph G'. Optimization may include reducing the number of vertices and/or edges used in the target graph G', reducing the area of target graph G', reducing the perimeter of graph G', reducing the average path lengths in target graph G', modifying the size, configuration or orientation of the islands of target graph G' or target G' itself, modifying the utilization of target graph G', modifying the location, orientation or number of bridges between islands, or any combination thereof. Those of ordinary skill in the art will appreciate that optimization may involve other modifications to target graph G'.

5.1.1 Assigning Vertices and Edges

Figure 2A:
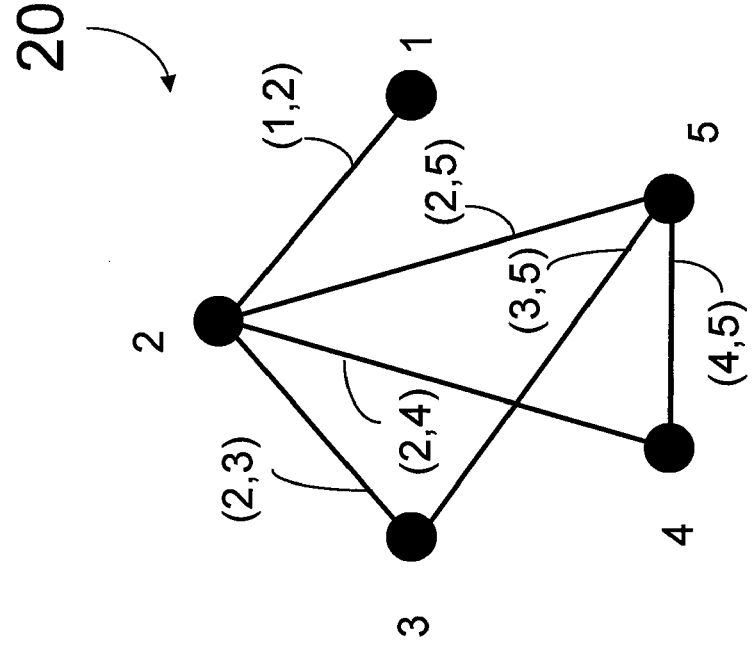

FIG. 2A illustrates an input graph G=(V, E) (labeled 200), with edges and vertices V={1,2,3,4,5}, E={(1,2), (2,3), (2,4), (2,5), (3,5), (4,5)}, that may be embedded according to the present systems, methods and apparatus. Those skilled in the art will appreciate that although graph 200 is unweighted, in other embodiments, graph 200 may be weighted.

Given an input graph G=(V,E), there exists an embedding for the input graph into an embedded graph G'=(V',E') and a labeling function l:V'→V. $V_v'=\{v'\in V'|l(v')=v\}$ and $E_v'=\{(u',v')\in E'|l(u')=l(v')=v\}$ are defined with the definitions $V'=\cup_{v\in V}V_v'$ and $E'=\{\cup_{v\in V}E_v'\}\cup\{\cup_{(u,v)\in E}E_{uv}'\}$, wherein the last term being unioned requires that if $E_{uv}'\neq\emptyset$ then (u, v)∈E. For a valid embedding, $G_v=(V_v',E_v')$ is required to be a connected graph.

An embedding G' of the input graph G is created such that each vertex v∈V corresponds to a set of vertices $V_v'$ in V', $|V_v'|\geq 1$ connected by a set of edges $E_v'$ such that the graph $G_v=(V_c',E_v')$ is connected. Furthermore, for every edge (u,v) ∈E there exists an edge (u',v')∈E' such that l(u)=u, l(v')=v, where l(v') is the reverse function which maps vertex v'∈V' to v∈V.

FIG. 2B illustrates an input of graph 200 into an embedded graph 200 G'=(V',E'). The embedding technique described herein will be referred to as braiding.

Let n=|V| and let EM[m,n], the target graph, denote the extended grid of size m×n. Iterating through all rows, starting with the first and given a numbered ordering of V, $n_v=\{1,2,\ldots,n\}$, layout all vertices in ascending order on the first row. The algorithm is shown below to an arbitrary source graph G into an embedded graph G'. Here i indexes the rows of the target grid $V_{EM}$ of the source graph G' and j indexes the columns of the target grid $V_{EM}$ of the embedded graph G'.

```
Let m = |V|−1
Let n = |V|
Let V_EM be the m × n matrix representing the vertices of EM
Let E_EM be the adjacency matrix representing the edges E'
For each v in V corresponding to v_v' in V'
    i = 1
    j = n_V(v)
    if isOdd(n_V(v))
        left = true
    else
        left = false
    end
    while i ≤ m
        V_EM(i, j) = v_v'
        i = i + 1
        jLast = j
        if left = true
            j = j + 1
        else
            j = j − 1
        end
        if left = true and j > n
            j = n
            left = false
```

-continued

```
        elseif left = false and j < 1
            j = 1
            left = true
        end
        if i ≦ m
            E_EM((i − 1, jLast),(i, j)) = e_v'
        end
    end
end
For each e = (u, v) in E corresponding to e_uv' in E_uv'
    i = 1
    searching = true
    while i ≦ m and searching = true
        while j ≦ n and searching = true
            jLast = 1
            j = 2
            if u = V_EM(i, jLast) and v = V_EM(i, j)
                E_EM((i, jLast),(i, j)) = e_uv'
                searching = false
            end
            jLast = j
            j = j + 1
        end
        i = i + 1.
    end
    E_EM = E_EM + E_EM^T
end
```

The above described algorithm is scalable to any number of vertices.

Those of skill in the art will appreciate that variations of the above rules are within the scope of the present systems, methods and apparatus. For example, in some embodiments, the rules for assignment of even $n_r(v)$ and odd $n_r(v)$ may be reversed, which is equivalent to rotating the graph 202 by 180°.

In FIG. 2B, the labeling of the rows of 202 is from bottom to top, and the labeling of the columns of 202 is from left to right. Therefore, the bottom, left-hand vertex of 202 has coordinates(i,j)=(1,1). However, those of skill in the art will appreciate that the rows may be populated top to bottom instead of bottom to top, and that the assignment of columns may be from right to left, instead of from left to right. Alternatively, rows and columns may be switched, with the resulting graphs remaining equivalent.

The first step of the technique is assignment of the vertices v' of graph 202 to correspond with vertices v of graph 200, arbitrarily starting with vertex $n_r(v)=n_r(1)=1$ of graph 200. The first vertex $v_v'=v_1'$ may be arbitrarily assigned to any location in 202, however, for convenience in the example, it has been assigned to coordinate (1,1). Each intra-island edge labeled $e_1'$ is assigned to connect adjacent pairs of vertices corresponding to $n_r(1)$.

Vertex 1 of Graph 200→Vertices $V_1'$ of Graph 202 (represented 1')
  m=4, n=5 and $n_r(1)=1$
  i=1, j=1, $n_r(1)$ is odd and left=true (i≦m)
  $v_1'$ is drawn at (i, j)=(1,1)
  i=2, jLast=1 and j=2 (left=true, j≦n and i≦m)
  $e_1'$ is drawn between (i−1, jLast)=(1,1) and (i, j)=(2,2)
  $v_1'$ is drawn at (i, j)=(2,2)
  i=3, jLast=2 and j=3 (left=true, j≦n and i≦m)
  $e_1'$ is drawn between (i−1, jLast)=(2,2) and (i, j)=(3,3)
  $v_1'$ is drawn at (i, j)=(3,3)
  i=4, jLast=3 and j=4 (left=true, j≦n and i≦m)
  $e_1'$ is drawn between (i−1, jLast)=(3,3) and (i, j)=(4,4)
  $v_1'$ is drawn at (i, j)=(4,4)
  i=5, jLast=4 and j=5 (left=true, j≦n, and i>m) end Vertex 2 of Graph 200→Vertices $V_2'$ of Graph 202 (represented 2')
  m=4, n=5 and $n_r(2)=2$
  i=1, j=2, $n_r(2)$ is even and left=false (i<m)
  $v_2'$ is drawn at (i, j)=(1,2)
  i=2, jLast=2 and j=1 (left=false, j≧1 and i≦m)
  $e_2'$ is drawn between (i−1, jLast)=(1,2) and (i, j)=(2,1)
  $v_2'$ is drawn at (i, j)=(2,1)
  i=3, jLast=1 and j=0 (left=false and j<1)
  j=1 and left=true (i≦m)
  $e_2'$ is drawn between (i−1, jLast)=(2,1) and (i, j)=(3,1)
  $v_2'$ is drawn at (i, j)=(3,1)
  i=4, jLast=1 and j=2 (left=true, j≦n and i≦m)
  $e_2'$ is drawn between (i−1, jLast)=(3,1) and (i, j)=(4,2)
  $v_2'$ is drawn at (i, j)=(4,2)
  i=5, jLast=2 and j=3 (left=true, j≦n and i>m)
  end Vertex 3 of Graph 200→Vertices $V_3'$ of Graph 202 (represented 3')
  m=4, n=5 and $n_r(3)=3$
  i=1, j=3, $n_r(3)$ is odd and left=true (i≦m)
  $v_3'$ is drawn at (i, j)=(1,3)
  i=2, jLast=3 and j=4 (left=true, j≦n and i≦m)
  $e_3'$ is drawn between (i−1, jLast)=(1,3) and (i, j)=(2,4)
  $v_3'$ is drawn at (i, j)=(2,4)
  i=3, jLast=4 and j=5 (left=true, j≦n and i≦m)
  $e_3'$ is drawn between (i−1, jLast)=(2,4) and (i, j)=(3,5)
  $v_3'$ is drawn at (i, j)=(3,5)
  i=4, jLast=5 and j=6 (left=true and j>n)
  j=5 and left=false (i≦m)
  $e_3'$ is drawn between (i−1, jLast)=(3,5) and (i, j)=(4,5)
  $v_3'$ is drawn at (i, j)=(4,5)
  i=5, jLast=5 and j=4 (left=false, j≧1 and i>m)
  end Vertex 4 of Graph 200→Vertices $V_4'$ of Graph 202 (represented 4')
  m=4, n=5 and $n_r(4)=4$
  i=1, j=4, $n_r(4)$ is even and left=false (i≦m)
  $v_4'$ is drawn at (i, j)=(1,4)
  i=2, jLast=4 and j=3 (left=false, j≧1 and i≦m)
  $e_4'$ is drawn between (i−1, jLast)=(1,4) and (i, j)=(2,3)
  $v_4'$ is drawn at (i, j)=(2,3)
  i=3, jLast=3 and j=2 (left=false, j≧1 and i≦m)
  $e_4'$ is drawn between (i−1, jLast)=(2,3) and (i, j)=(3,2)
  $v_4'$ is drawn at (i, j)=(3,2)
  i=4, jLast=2 and j=1 (left=false, j≧1 and i≦m)
  $e_4'$ is drawn between (i−1, jLast)=(3,2) and (i, j)=(4,1)
  $v_4'$ is drawn at (i, j)=(4,1)
  i=5, jLast=1 and j=0 (left=false, and j<1)
  j=and left=true (i>m)
  end Vertex 5 of Graph 200→Vertices $V_5'$ of Graph 202 (represented 5')
  m=4, n=5 and $n_r(5)=5$
  i=1, j=5, $n_r(5)$ is odd and left true (i≦m)
  $v_5'$ is drawn at (i, j)=(1,5)
  i=2, jLast=5 and j=6 (left=true and j>n)
  j=5 and left=false (i≦m)
  $e_5'$ is drawn between (i−1, jLast)=(1,5) and (i, j)=(2,5)
  $v_5'$ is drawn at (i, j)=(2,5)
  i=3, jLast=5 and j=4 (left=false, j≧1 and i≦m)
  $e_5'$ is drawn between (i−1, jLast)=(2,5) and (i, j)=(3,4)
  $v_5'$ is drawn at (i, j)=(3,4)
  i=4, jLast=4 and j=3 (left=false, j≧1 and i≦m)

$e_5'$ is drawn between (i−1, jLast)=(3,4) and (i, j)=(4,3)

$v_5'$ is drawn at (i, j)=(4,3)

i=5, jLast=3 and j=2 (left=false, j≧1 and i>m)

end

At the end of vertex assignment, all vertices v have been assigned a corresponding island, thereby creating a set of islands, each having n−1 vertices. The number of vertices in each island is not necessarily limited to n−1 and there may be either more or fewer vertices in some embodiments. Also, while in FIG. 2B, each island contains exactly one vertex in each row of the square lattice, the present systems, methods and apparatus are not restricted to this limitation.

Next, bridges $E_{uv}'$ of graph 202 corresponding to the edges E of graph 200 are assigned. The vertices $V_v'$ of each island representing a source vertex v are linked together by inter-island edges $E_{uv}'$, shown by solid lines in FIG. 2B, corresponding to the edge e of graph 200. The number of inter-island edges is not limited, and there may be more than one inter-island edge $E_{uv}'$ in some embodiments.

This assignment of edges E to bridges $E_{uv}'$ may occur in any number of ways, as will be appreciated by those of skill in the art. For example, edge assignment may be done by scanning each row i of graph 202 from left to right for adjacent embedded islands of vertices corresponding to source vertices between which there is an edge e in graph 200, starting from row i=1 and continuing until all edges E have been assigned to a corresponding bridges $E_{uv}'$. In the illustrated example, the following edges E need to be assigned to bridges $E_{uv}'$ in graph 202: E={(1,2), (2,3), (2,4), (2,5), (3,5), (4,5)}. Islands of vertices $V_1'$ and $V_2'$, $V_2'$ and $V_3'$, and $V_4'$ and $V_5'$ are adjacent in row j=1, so edges E={(1,2), (2,3), (4,5)}, respectively, can be assigned. Islands of vertices $V_2'$ and $V_4'$, $V_2'$ and $V_5'$, and $V_3'$ and $V_5'$ are not adjacent in row j=1, so it is necessary to proceed to row j=2. In row 2, the only missing island pair is islands of vertices found is $V_3'$ and $V_5'$ (corresponding to edge e=(3,5) and representing $e_{3,5}'$=(3,5)). In row j=3, missing edge e=(2,4) can be assigned between islands vertices $V_2'$ and $V_4'$ since those islands are adjacent in row j=3, and finally, in row j=4, the missing edge e=(2,5) can be assigned to bridge $e_{2,5}'$=(2,5) between adjacent islands of vertices $V_2'$ and $V_5'$.

Those of skill in the art will appreciate that FIG. 2B illustrates only one way of translating edges E of graph 200 to bridges $E_{uv}'$ of graph 202, where all of the bridges $E_{uv}'$ occur along one of the primary orthogonal axes (e.g., the horizontal axis), and that this is only one approach to edge assignment, and that edge assignment may occur in any number of ways, so long as each edge e appears as a corresponding bridge $E_{uv}'$ in graph 202. For example, multiple bridges may be assigned to represent a single edge e, or the bridges may be assigned to non-orthogonal positions within graph 202.

5.1.2 Optimizing the Embedding

Once all of the vertices V and edges E of graph 200 have been assigned to islands of vertices $V_v'$, each island corresponding to one vertex in V, and bridges $E_{uv}'$ of graph 202, in some embodiments it may be desirable to optimize the embedding.

Optimization may include reducing the number of vertices and/or edges used in the target graph G', reducing the area of target graph G', reducing the perimeter of graph G', reducing the average path lengths in target graph G', modifying the size, configuration or orientation of the islands of target graph G' or target G' itself, modifying the utilization of target graph G', modifying the location, orientation or number of bridges between islands, or any combination thereof. Those of ordinary skill in the art will appreciate that optimization may involve other modifications to target graph G' and that there are many different techniques that can be applied to optimize the embedding, and in some cases several techniques may be used in conjunction to achieve optimization.

One simple technique that can be applied to the braided layout construction is to remove at least one extraneous vertex $v_v'$ in each island corresponding to vertex v. That is, for an island of connected vertices $V_v'$ representing a single vertex v in 200, if a given vertex $v_v'$ in the island is only connected to one other vertex $v_v'$ representing the same vertex v in 200 (i.e., it is on the perimeter of the island and is not connected by a bridge to an island representing a second vertex v of the source graph 200), then the singly-connected vertex $v_v'$ and the intra-island edge $E_v'$ between it and the other vertex $v_v'$ in the island can be removed without consequence (i.e., without destroying the embedding). If removal of an extraneous vertex $v_v'$ occurs, then all the vertices $v_v'$ in the island may be re-evaluated, since the removal of the extraneous vertex $v_v'$ may have resulted in additional at least one additional extraneous vertices $v_v'$ in $V_v'$.

Figure 2C:
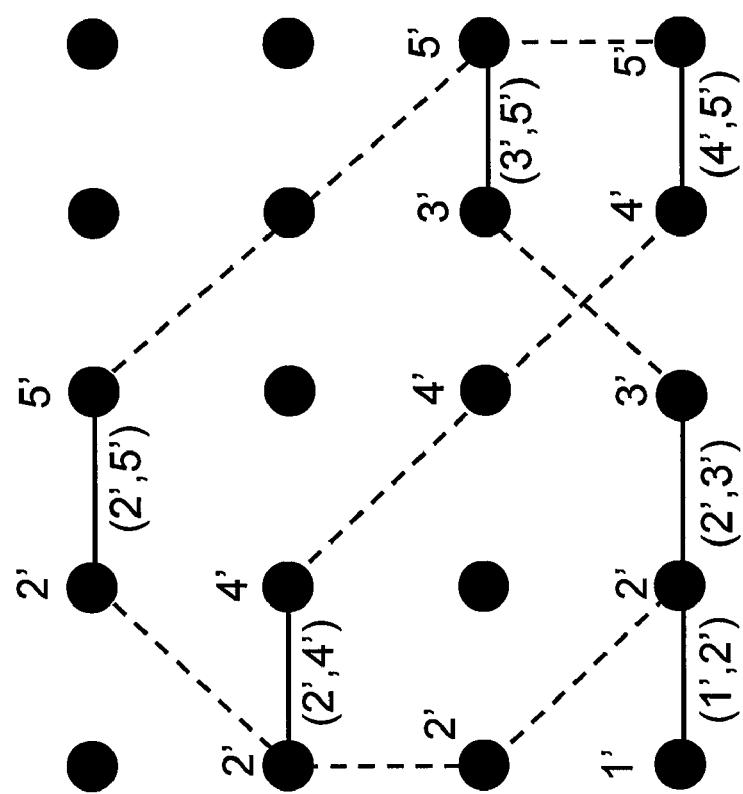
FIGS. 2C, 2D, 2E and 2F are schematic diagrams showing optimizations of an embedded graph in accordance with at least one illustrated embodiment of the present systems, methods and apparatus.

Graph G″ (labeled 204 in FIG. 2C), is the same as graph 202 of FIG. 2B, except that in graph 204 all of the extraneous vertices $v_v'$ have been removed from the embedding:

Starting with the island of vertices $V_1'$ (shown as 1' in FIGS. 2B, 2C, 2D, 2E and 2F), vertex $v_1'$ in row 4 is not connected to any vertex other than vertex $v_1'$ in row 3, so vertex $v_1'$ in row 4 can be removed, at which point vertex $v_1'$ in row 3 is not connected to any vertex other than vertex $v_1'$ in row 2, so vertex $v_1'$ in row 3 can be removed. Now, Vertex $v_1'$ in row 2 can then be removed since it is not connected to any vertex other than vertex $v_1'$ in row 1.

Continuing with the island of vertices $V_2'$ (shown as 2' in FIGS. 2B, 2C, 2D, 2E and 2F), vertex $v_2'$ in row 4 is connected to both vertex $v_5'$ in row 4 and vertex $v_2'$ in row 3, so cannot be removed. Vertex $v_2'$ in row 1 is connected to both vertex $v_3'$ in row 1 and vertex $v_2'$ in row 2, so cannot be removed. The other two vertices $v_2'$ remain connected by intra-island edges to two $v_2'$ vertices, so no vertex $v_2'$ is extraneous.

Moving on to the island of vertices $V_3'$ (shown as 3' in FIGS. 2B, 2C, 2D, 2E and 2F), vertex $v_3'$ in row 4 is not connected to any vertex other than vertex $v_3'$ in row 3, so it can be removed, leading to the removal of vertex $v_3'$ in row 3, since it is only connected to vertex $v_3'$ in row 2.

For the island of vertices $V_4'$ (shown as 4' in FIGS. 2B, 2C, 2D, 2E and 2F), vertex $v_v'$ in row 4 is not connected to any vertex other than vertex $v_4'$ in row 3, so it can be removed. No other vertex $v_4'$ can be removed since vertex $v_4'$ in row 3 is connected to vertices $v_2'$ and $v_4'$ in rows 3 and 2 respectively, and vertex $v_4'$ in row 1 is connected to vertices $v_4'$ and $v_5'$ in rows 2 and 1 respectively. Therefore vertex $v_4'$ in row 2 remains connected to vertices $v_4'$ in rows 1 and 3.

Finally, for the island of vertices $V_5'$ (shown as 5' in FIGS. 2B, 2C, 2D, 2E and 2F), no vertex $v_5'$ can be removed, as vertex $v_5'$ in row 4 is connected to vertices $v_2'$ and $v_5'$ in rows 4 and 3 respectively. Vertex $v_5'$ in row 1 is connected to vertices $v_4'$ and $v_5'$ in rows 1 and 2 respectively. Therefore all vertices $v_5'$ are connected to two other vertices.

Extraneous vertex removal technique may produce a graph 204 containing six fewer vertices than graph 202. Those of skill in the art will appreciate that while in the example, each of the islands were considered in numerical order, the order of consideration is not so restricted and another order may be used, or the islands may be considered in a random order.

An alternative technique for optimization, which may be employed before or after extraneous vertices are removed, is degree-K pruning, where K is a positive integer. An example of this technique is degree-1 pruning, in which an arbitrary bridge between two islands is removed followed by the removal of all extraneous vertices (such as through the procedure described above for deriving graph 204 from graph 202) caused by the removal of the arbitrary bridge, then the re-establishment of the bridge is attempted. Those of skill in the art will appreciate that the selection of the bridge to be removed may occur in any number of ways, such as removing a bridge attached to the island having the fewest or most vertices $v_1$, removing a bridge closer to the middle or an end of the island, removing a bridge closest to the centre or the perimeter of the graph, or simply removing a randomly-selected bridge. Similarly, the choice of where to re-establish the bridge may be done according to a rule, such as a bias against re-establishing the bridge in a location between the islands already considered during the optimization process, by using an algorithm such as a path finding algorithm between the two islands, or it may be done randomly.

Figure 2E:
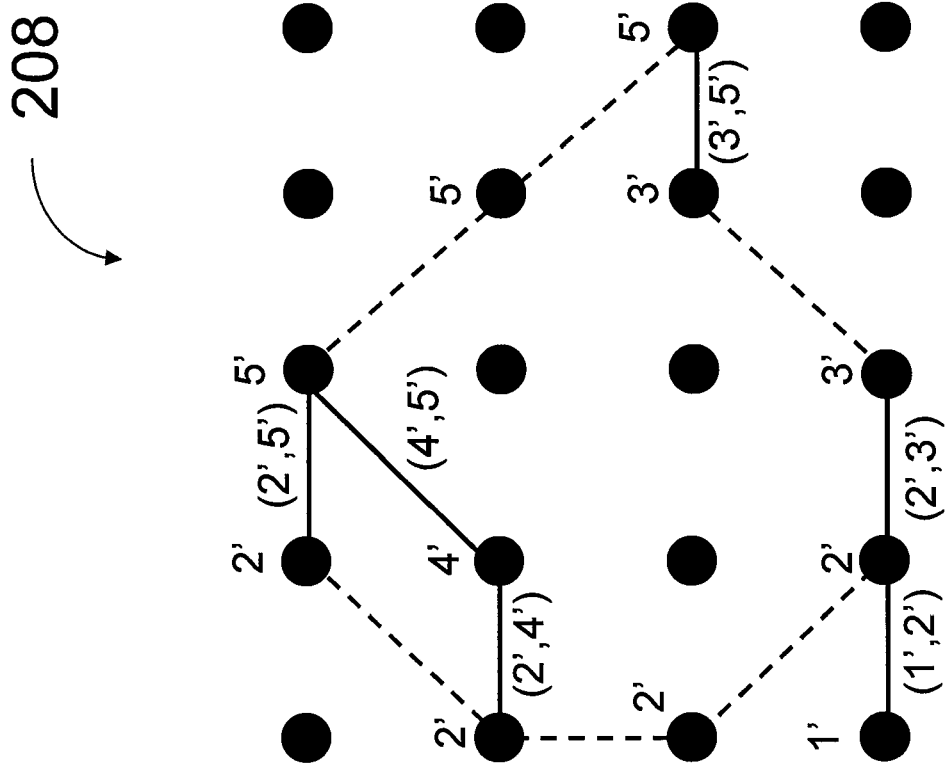
Figure 2D:
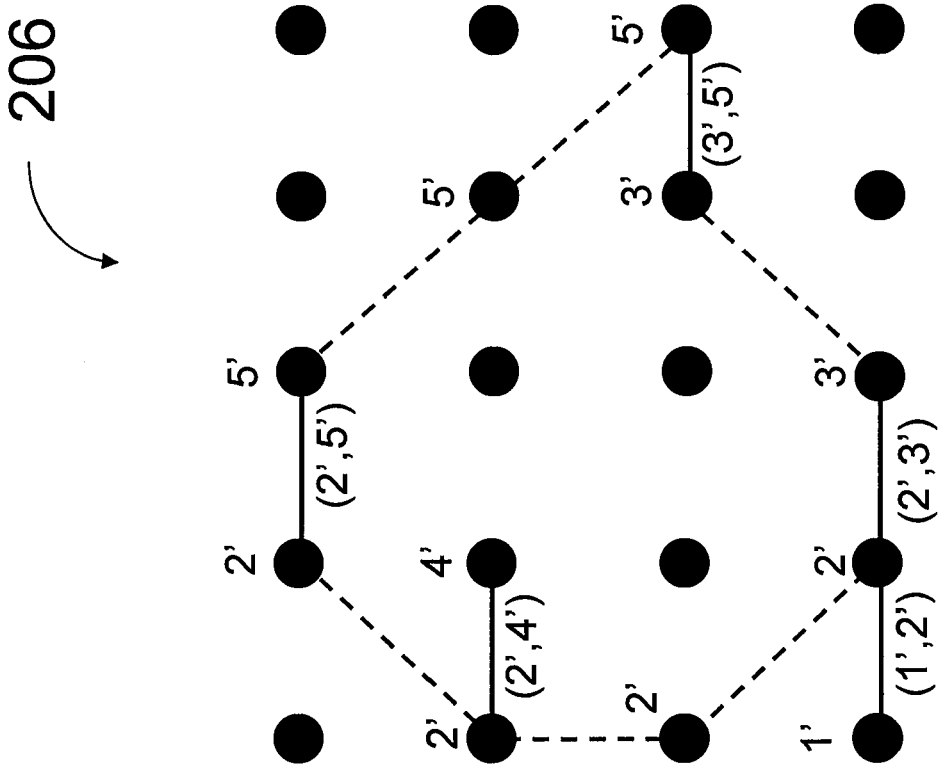
Figure 2F:
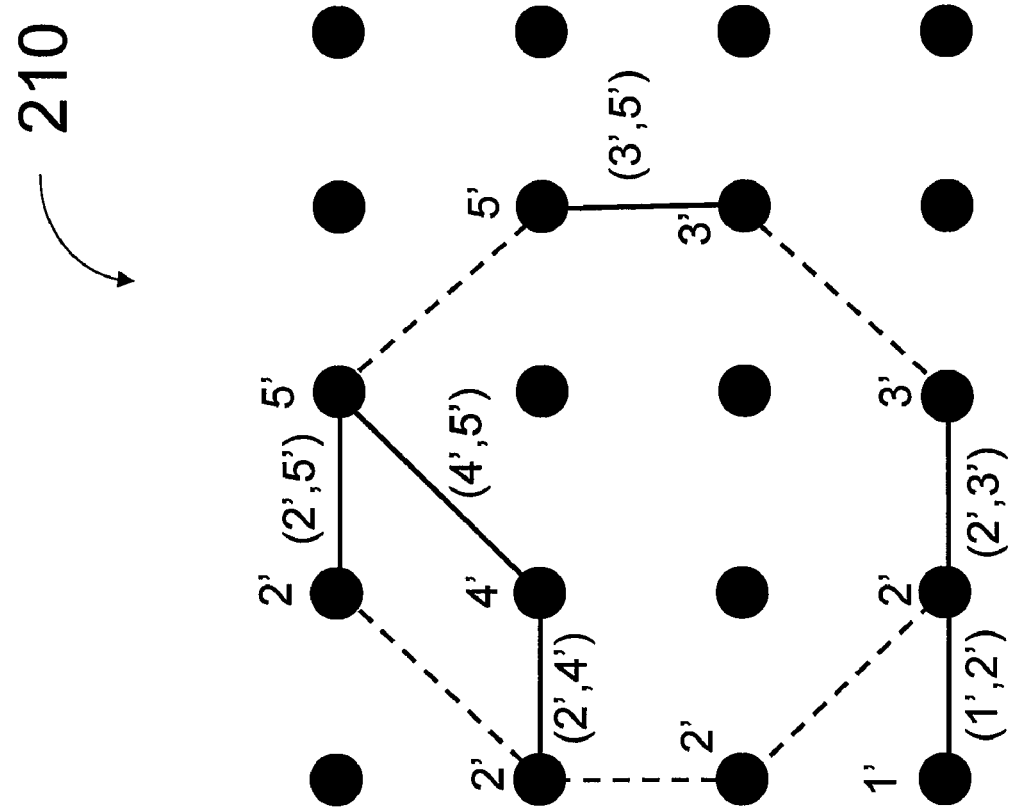

As an example of a possible optimization, FIG. 2D illustrates a graph $G^{(3)}$ (labeled 206) that is the same embedding as graph 204, except that bridge edge $e_{4,5}'$ has been removed and the vertices rendered extraneous by the bridge removal have been removed from their associated islands (two vertices from the island of vertices $V_4'$ in rows 1 and 2, and one vertex from the island of vertices $V_5'$ in row 1).

Bridge $e_{4,5}'$ must then be re-established between island $V_4'$ and island $V_5'$ in order to keep the embedding equivalent to graph 204. For example, a path finding algorithm may be used to determine how to re-establish the bridge. Re-establishing the bridge may include using vertices of EM that are not currently being used (e.g., previously extraneous vertices that had been removed) to build a path. FIG. 2E illustrates one possible graph $G^{(4)}$ (labeled 208) where bridge $e_{4,5}'$ has been re-established in the upper section of graph 208 between vertex $v_4'$ in row 3 and vertex $v_5'$ in row 4, using no additional vertices. Thus, in this case, the degree-1 pruning produced a more efficient embedding than graph 206 of FIG. 2C. In some cases, degree-1 pruning may re-establish the same vertices and edges that had originally been removed, resulting in no net gain in efficiency.

Degree-1 pruning may be attempted on multiple bridges, or even on every bridge in the graph. Since changing the configuration can lead to possibilities for drawing more efficient embeddings that were not available before, if degree-1 pruning on one bridge produces a different configuration, then degree-1 pruning may be attempted on all bridges again, even if degree-1 pruning was attempted on them previously. For example, degree-1 pruning may be done on graph 208 such that bridge $e_{3,5}'$ is removed and then re-established along column 3, producing graph $G^{(5)}$ of FIG. 2F (labeled 210). Thus, the area needed to embed graph 200 is reduced from a grid of size 5×4 to a second grid of size 3×4. This pruning was not possible before the removal of bridge $e_{4,5}'$ and extraneous vertices previously assigned to island of vertices $V_1'$.

Degree-1 pruning may continue to be applied to the target graph until further applications of pruning may not result in changing the configuration of the embedding or may not increase the efficiency of the embedding. Where multiple shortest path possibilities exist for the same degree-1 pruning, the path that leads to the most efficient embedding may be determined. Furthermore, other optimization methods may be used in conjunction with degree-1 pruning. Degree-K pruning, wherein K>1, may be attempted on the graph embedding in addition to degree-1 pruning. Degree-K embedding comprises removing K bridges, removing the resulting extraneous vertices, and re-establishing the K removed bridges via, e.g., a path finding algorithm.

In FIG. 2B, vertices 1 through 5 were arbitrarily assigned to the islands of vertices $v_v'$. However, degree-1 pruning, and degree-K pruning in general, is very susceptible to the assignment of the vertices to islands, and if the assignments of vertices to the islands were different, the bridges may be located in different places than in graph 202. Since degree-K pruning is dependent on the location of the bridges, degree-K pruning of two embeddings that have the same islands but different vertex assignments (and thus different bridge locations) may produce vastly different results. Thus, optimization of the graph embedding may include degree-K pruning of a set of embeddings with the same islands but different vertex and bridge assignments and selecting the most efficient result.

Those of skill in the art will appreciate that other possible optimization techniques may be employed. For example, optimization may include removing a vertex $v_1'$ from an island or joining an additional vertex $v_1'$ to an island. For example, an additional vertex $v_1'$ may be added to an arbitrary island followed by removal of an arbitrary bridge, extraneous vertex removal, and then bridge re-establishment.

Optimization may continue for a predetermined number of iterations, a predetermined period of time, until the graph achieves certain characteristics (e.g., perimeter length, area, shape) or a predetermined efficiency metric, or some other selected set of criteria for termination.

5.2 Outward Expansion Technique

Another technique for embedding a source graph onto a target graph is an outward expansion technique. The first step in the outward expansion technique is to create an ordered list of vertices of the source graph. The list may be ordered according to the number of edges connected to each vertex v (i.e., degree), with the vertex v having the most connected edges first in the list. Alternatively, the list may be ordered in some other manner, such as randomly or using another technique, such as ST ordering, which is described in Brandes, 2002, ESA 2002 *Lecture Notes in Computer Science* 2461, pp. 247-256.

Figure 3B:
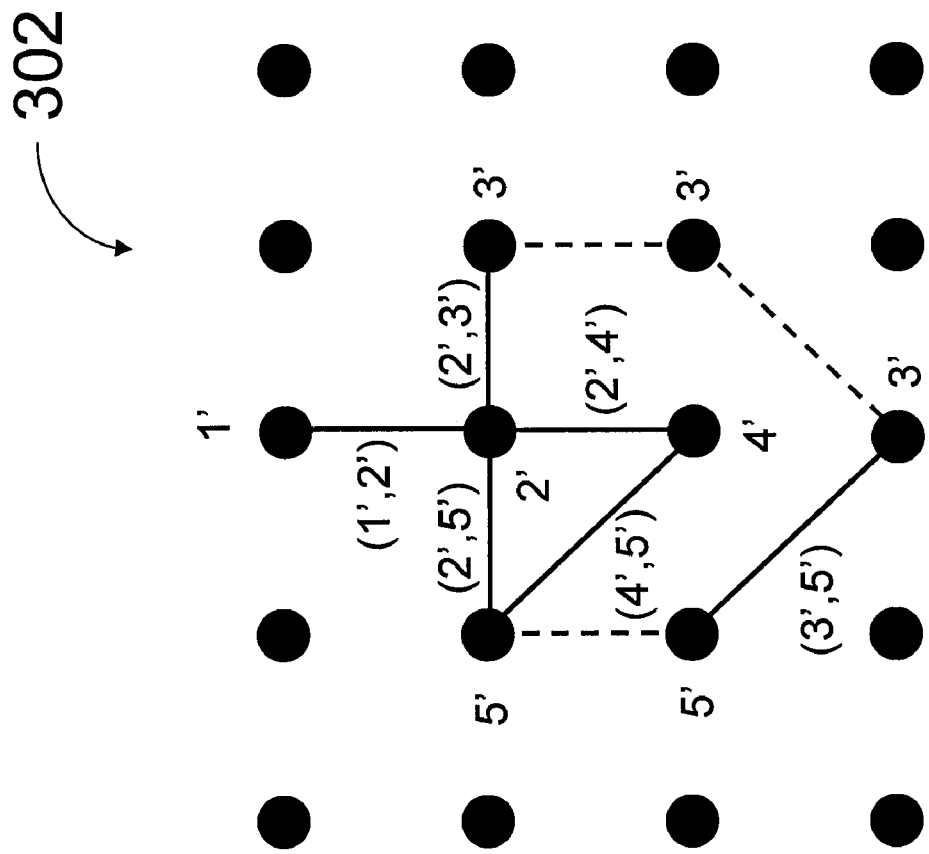
Figure 3A:
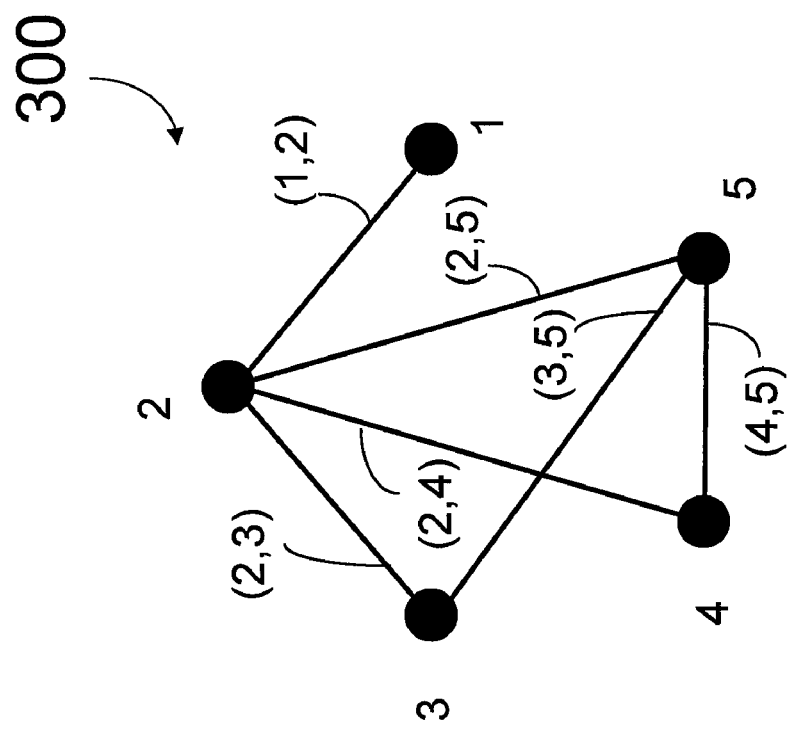

An example of outward expansion embedding of an arbitrary target graph into a source graph is shown in FIGS. 3A and 3B, whereby graph G (labeled 300, and the same as graph 200 of FIG. 2A) is embedded onto graph G' (labeled 302) of FIG. 3B (a subset of the extended grid EM). The list of vertices V for graph 300, ordered by degree (or number of connected edges E), is V={2,5,3,4,1}. Since vertices 3 and 4 have the same number of connected edges, they are commutable within the list, (i.e., an equivalent order would be V={2,5,4,3,1}).

Next, each vertex v is embedded onto graph 302 as an island of vertices $v_v'$, starting with vertex 2, the first vertex in the ordered list. The island may be a single vertex $v_v'$ or it may include multiple vertices $V_v'$ connected by at least one intra-island edge $e_v'$ (shown as dashed lines in FIGS. 3B and 3C). In the example, vertex 2 has been assigned to a single vertex $v_2'$ located in the central area of graph 302.

The next step is to assign each vertex v connected to vertex 2 via edges E, to an island $v_v'$. The order of the assignment of vertices connected to vertex $v_2'$ may or may not be defined by the ordered list. The islands connected to vertex $v_2'$ may be assigned to nearest neighbor vertices in relation to vertex $v_2'$, or alternatively, the islands may be assigned to next-nearest neighbor vertices $v_v'$ in relation to vertex $v_2'$, or still alternatively, they may be assigned to an arbitrary vertex (or vertices) in graph 302. As with the first vertex v, each island may be a single vertex $v_v'$ or it may include multiple vertices $V_v'$ connected by at least one intra-island edge $e_v'$. For example, if the degree of any vertex v to be placed in the square lattice exceeds the degree of the vertices in graph 302 (in this case 8), multiple vertices $V_v'$ connected by at least one intra-island edge $E_v'$ may be used to represent the vertex v instead of a single vertex $v_v'$. In FIG. 3B, vertices $v_1'$, $v_3'$, $v_4'$ and $v_5'$, which are all connected to $v_2'$, have been assigned to nearest neighbor vertices relative to vertex $v_2'$.

Next, edges in the source graph connecting any two vertices of the source graph already assigned to islands in graph 302 are embedded as bridges (i.e., a bridge or an inter-island edge $e_{uv}'$ and shown as solid lines in FIGS. 3B and 3C). Thus, in the example, edges e={(1,2),(2,3),(2,4),(2,5)} (edges connected to source vertex 2) and e=(4,5) are assigned as bridges $E_{uv}'$ in graph 302. This may be done, for example, by using a path finding algorithm. After all source graph edges connected to vertex 2 have been assigned to bridges in graph 302, the assignment of vertices continues by assigning another source graph vertex from the ordered list (V={2,5,3,4,1}) not already assigned to an island in 302. In the example, since all source graph vertices were assigned while assigning source graph vertices connected to source graph vertex 2, vertex assignment is complete.

The next act of the outward expansion technique is to complete the assignment of the source graph edges E to bridge edges $E_{uv}'$. In the example, the only edge e that was not assigned to a bridge in the previous step was edge e=(3,5). One possible approach is to use a path finding algorithm to find an appropriate path for the bridge corresponding to edge e=(3,5). Alternatively, or additionally, unused vertices in EM may be used to form the path that represents the edge. FIG. 3B shows one possible path for edge e=(3,5), which was done by extending two of the already placed islands with additional vertices $V_v'$ created (one additional vertex $v_5'$ and two additional vertices $V_3'$) in order to complete the assignment of edge e=(3,5) to a bridge edge $e_{3,5}'$. However, those skilled in the art will appreciate that the illustrated embedding of edge e=(3,5) is not unique and FIG. 3B only illustrates one possibility.

As in the braided layout technique, variations in the assignment of the vertices of V to the islands of $V_v'$ can lead to variations in how the outward expansion technique embeds graph 300 onto graph 302, with some variations being more efficient than others. For example, in FIG. 3B, vertex $v_4'$ was arbitrarily placed below vertex $v_2'$ and vertex $v_5'$ was arbitrarily placed to the left of vertex $v_2'$. If, in graph G'' as shown in FIG. 3C (labeled 304), vertex $v_4'$ and vertex $v_5'$ are switched, embedding edges e=(3,5) and e=(4,5) in graph 304 can be done with a single diagonal bridge for each edge, resulting in a more efficient embedding than the embedding shown in FIG. 3B, since the area needed to embed graph 304 is reduced from a grid size of 3×4 to a grid size of 3×3. Thus, variations in assignment of vertices may be taken into consideration when placing vertices and edges.

Unlike the braided layout technique, which starts off by constructing a very general embedding and optimizing it, the outward expansion technique optimizes the embedding as it progresses. That is, as each vertex is placed, placement of the vertex and its resulting island is optimized. Optimization may include redrawing already placed paths to accommodate for new paths and/or changing vertex assignments.

Optimization may also or alternatively include adding an additional vertex to an island. The purpose of adding a vertex is to create additional access points to the island where the number of available unassigned vertices adjacent to the island is reduced to zero or close to zero. Where the target graph has vertices with degrees of 8, connecting a single additional vertex to an island may add up to seven additional locations for a bridge to connect to the island.

5.3 Embedding on Hardware

Figure 4:
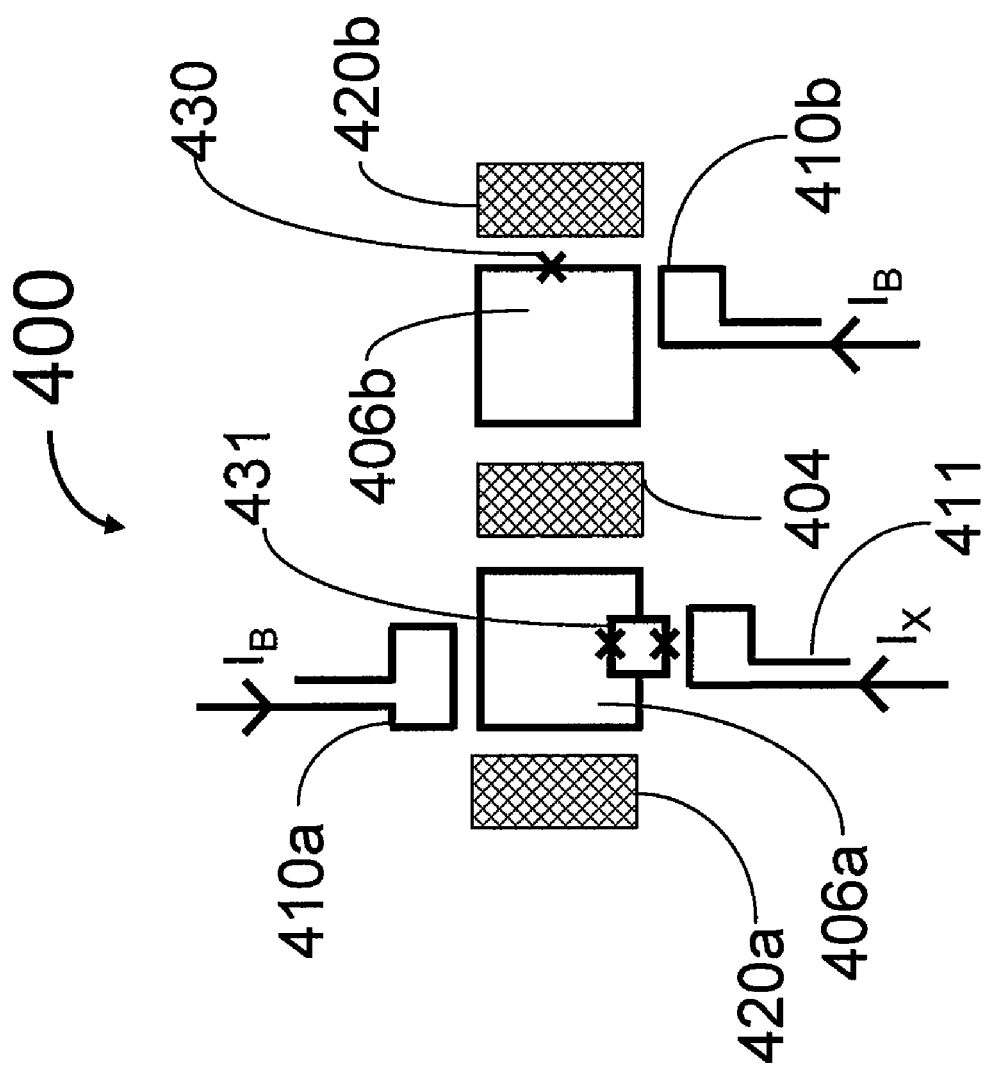
FIG. 4 is a schematic diagram of showing an integrated circuit in accordance with at least one illustrated embodiment of the present systems, methods and apparatus.

FIG. 4 illustrates a portion of an integrated circuit into which a mapping of a braided layout may be embedded. FIG. 4 illustrates a translation of one vertex 104 of grid 102 of FIG. 1A or extended grid 108 of FIG. 1B connecting two vertices 106 of grid 102 of FIG. 1A or extended grid 108 of FIG. 1B to an integrated circuit 400. Integrated circuit 400 includes superconducting nodes 406a and 406b, which corresponds to two vertices 106 of grid 102 of FIG. 1A or extended grid 108. Integrated circuit 400 further includes bias devices 410a and 410b as well as readout devices 420a and 420b respectively, and a single coupling device 404, which corresponds to one vertex 103 connecting two vertices 106 of grid 102 of FIG. 1A or extended grid 108. In FIG. 4, nodes 406a and 406b, each rf-SQUIDs, may include a single Josephson junction 430, or a compound Josephson junction 431. The compound Josephson junction 431 can also be described as a dc-SQUID interrupting a superconducting loop. Magnetic flux can then be applied to the compound Josephson junction 431 to provide an extra degree of modulation of the node parameters. Specifically, the tunneling rate of the quantum device (superconducting node 406a) can be adjusted by varying the current supplied by device 411.

Nodes 406a and 406b may be three Josephson junction qubits. Such structures comprise a superconducting loop interrupted by three Josephson junctions. Nodes 406a and 406b in integrated circuit 400 each have two states that correspond to the two possible directions of current or supercurrent flow in their respective superconducting loops. For instance, a first state of node 406a and of 406b is represented by clockwise circulating current and a second state is represented by counter-clockwise circulating current in their respective superconducting loops. The circulating currents corresponding to each of the states characterize distinct magnetic fields generated by such circulating currents.

Readout devices 420a and 420b and coupling device 404 are illustrated in FIG. 4 with the same shaded box because, in some embodiments, they are the same type of device, having similar structure and components, but configured to perform different functions in integrated circuit 400. For example, coupling device 404 can be a dc-SQUID configured to tunably couple nodes 406a and 406b. Coupling device 404 may be monostable, meaning it only has one potential minimum. Readout devices 420a and 420b may be dc-SQUIDs inductively coupled to corresponding nodes and configured to controllably detect the current in such nodes. Alternatively, readout devices 420a and 420b may be any device capable of detecting the state of corresponding nodes 406a and 406b.

Bias devices 410a and 410b are illustrated in FIG. 4 as loops of metal. A local magnetic field can be applied to the corresponding node from a bias device 410a or 410b by driving a current through the loop of the bias device. Bias devices 410a and 410b may be made of metals that are superconducting at low temperatures, such as aluminum and niobium. The bias devices may not be loops, but simply wires that pass near corresponding nodes 406a and 406b thereby coupling magnetic flux into the loops. Each bias device 410a and 410b may comprise a wire that passes near a corresponding node, then connects to another metal layer, such as a ground plane, on the chip using a via.

By embedding a braided layout onto an integrated circuit configured in a grid 102 of FIG. 1A or extended grid 108 of FIG. 1B having superconducting nodes 406 and coupling devices 404, a problem corresponding to the braided layout can be solved. The integrated circuit may be part of a quantum computer, and the quantum computer may use the natural physical evolution of the coupled qubits which are manipulated by the control circuitry of the quantum computer to solve the problem corresponding to the braided layout embedded into the integrated circuit of the quantum computer. Starting from a known initial Hamiltonian, the guided physical evolution of the integrated circuit may be completed, so that the final state of the system contains information relating to the answer to the problem corresponding to the braided layout.

5.4 System Hardware

Figure 5:
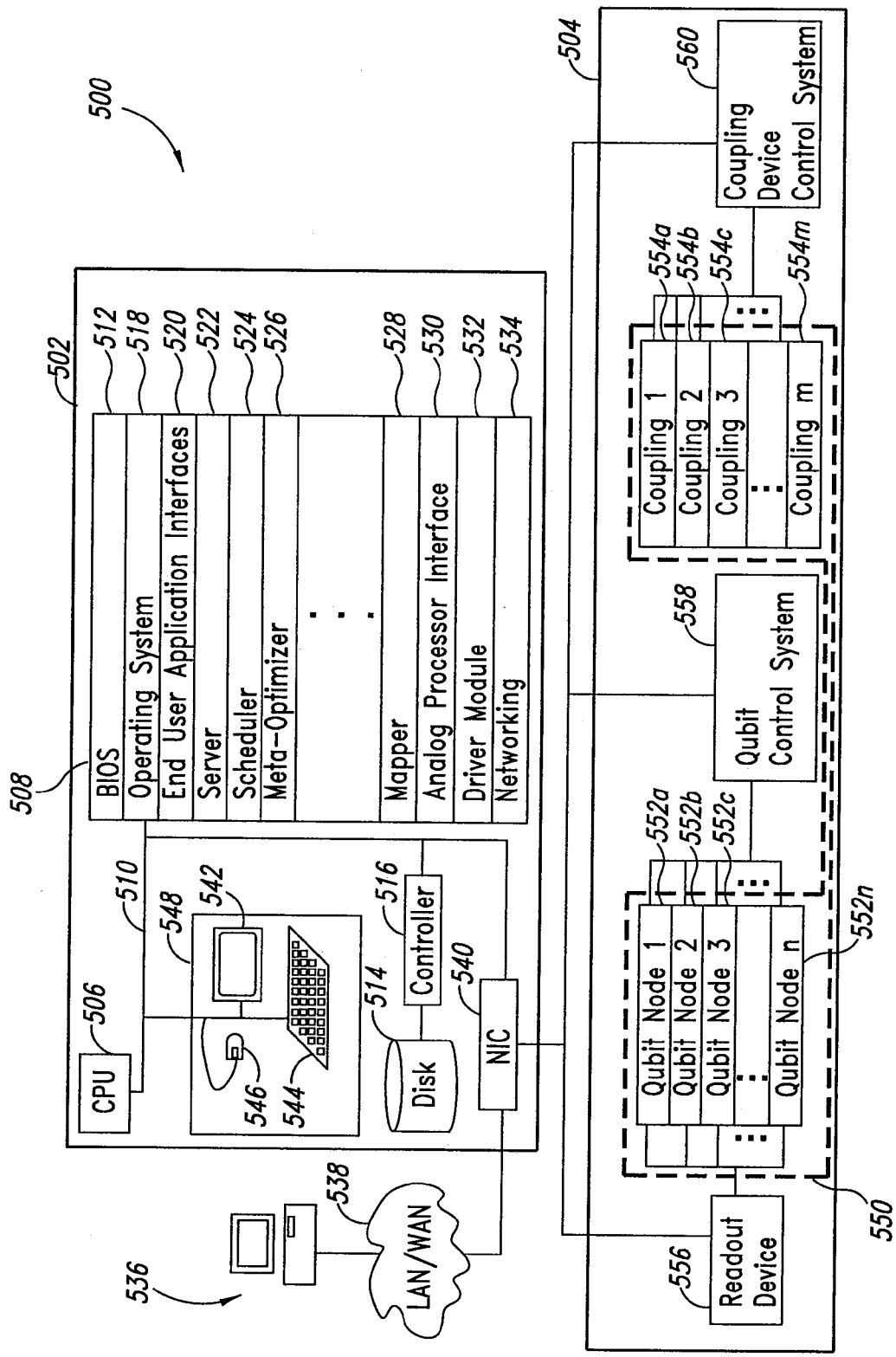
FIG. 5 is a functional block diagram showing a computing system that employs at least one analog processor in accordance with to at least one illustrated embodiment of the present systems, methods and apparatus.

FIG. 5 and the following discussion provide a brief and general description of a suitable computing environment in which various embodiments of the computing system may be implemented. Although not required, embodiments will be described in the general context of computer-executable instructions, such as program application modules, objects or macros being executed by a computer. Those skilled in the relevant art will appreciate that the disclosed systems, methods and articles can be practiced with other computing system configurations, including hand-held devices, multiprocessor systems, microprocessor-based or programmable consumer electronics, personal computers ("PCs"), network PCs, minicomputers, mainframe computers, and the like. The embodiments can be practiced in distributed computing environments where tasks or modules are performed by remote processing devices, which are linked through a communications network. In a distributed computing environment, program modules may be located in both local and remote memory storage devices.

FIG. 5 shows a computing system 500 operable to solve problems with queries of one or more relational databases, according to one illustrated embodiment.

The computing system 500 includes a digital computing subsystem 502 and an analog computing subsystem 504 communicatively coupled to the digital computing subsystem 502.

The digital computing subsystem 502 includes one or more processing units 506, system memories 508, and system buses 510 that couple various system components including the system memory 508 to the processing unit 506. The digital computing subsystem 502 will at times be referred to in the singular herein, but this is not intended to limit the application to a single digital computing subsystem 502 since in typical embodiments, there will be more than one digital computing subsystem 502 or other device involved. Other computing systems may be employed, such as conventional and personal computers, where the size or scale of the system allows. The processing unit 506 may be any logic processing unit, such as one or more central processing units ("CPUs"), digital signal processors ("DSPs"), application-specific integrated circuits ("ASICs"), etc. Unless described otherwise, the construction and operation of the various blocks shown in FIG. 5 are of conventional design. As a result, such blocks need not be described in further detail herein, as they will be understood by those skilled in the relevant art.

The system bus 510 can employ any known bus structures or architectures, including a memory bus with memory controller, a peripheral bus, and a local bus. The system memory 508 may include read-only memory ("ROM") and random access memory ("RAM"). A basic input/output system ("BIOS") 512, which can form part of the ROM, contains basic routines that help transfer information between elements within the digital computing subsystem 502, such as during startup.

The digital computing subsystem 502 also includes non-volatile memory 514. The non-volatile memory 514 may take a variety of forms, for example a hard disk drive for reading from and writing to a hard disk, and an optical disk drive and a magnetic disk drive for reading from and writing to removable optical disks and magnetic disks, respectively. The optical disk can be read by a CD-ROM, while the magnetic disk can be a magnetic floppy disk or diskette. The hard disk drive, optical disk drive and magnetic disk drive communicate with the processing unit 506 via the system bus 510. The hard disk drive, optical disk drive and magnetic disk drive may include appropriate interfaces or controllers 516 coupled between such drives and the system bus 510, as is known by those skilled in the relevant art. The drives, and their associated computer-readable media, provide non-volatile storage of computer readable instructions, data structures, program modules and other data for the digital computing subsystem 502. Although the depicted digital computing subsystem 502 has been described as employing hard disks, optical disks and/or magnetic disks, those skilled in the relevant art will appreciate that other types of non-volatile computer-readable media that can store data accessible by a computer may be employed, such a magnetic cassettes, flash memory cards, digital video disks ("DVD"), Bernoulli cartridges, RAMs, ROMs, smart cards, etc.

Various program modules or application programs and/or data can be stored in the system memory 508. For example, the system memory 508 may store an operating system 518, end user application interfaces 520, server applications 522, scheduler modules 524, and/or meta-optimizer modules 526. Also for example, the system memory 508 may additionally or alternatively store one or more mapper modules 528, analog processor interface modules 530, and/or driver modules 532. The operation and function of these modules are discussed in detail below.

The system memory 508 may also include one or more networking applications 534, for example a Web server application and/or Web client or browser application for permitting the digital computing subsystem 502 to exchange data with sources via the Internet, corporate Intranets, or other networks as described below, as well as with other server applications on server computers such as those further discussed below. The networking application 534 in the depicted embodiment is markup language based, such as hypertext markup language ("HTML"), extensible markup language ("XML") or wireless markup language ("WML"), and operates with markup languages that use syntactically delimited characters added to the data of a document to represent the structure of the document. A number of Web server applications and Web client or browser applications are commercially available such those available from Mozilla and Microsoft.

While shown in FIG. 5 as being stored in the system memory 508, the operating system 518 and various applications 520, 522, 524, 526, 528, 530, 532, 534 and/or data can be stored on the hard disk of the hard disk drive, the optical disk of the optical disk drive and/or the magnetic disk of the magnetic disk drive.

The digital computing subsystem 502 can operate in a networked environment using logical connections to one or more end user computing systems 536 (only one shown), such as one or more remote computers or networks. The digital computing subsystem 502 may be logically connected to one or more end user computing systems 536 under any known method of permitting computers to communicate, for example through a network 538 such as a local area network ("LAN") and/or a wide area network ("WAN") including, for example, the Internet. Such networking environments are well known including wired and wireless enterprise-wide computer networks, intranets, extranets, and the Internet. Other embodiments include other types of communication networks such as telecommunications networks, cellular networks, paging networks, and other mobile networks. The information sent or received via the communications channel may, or may not be encrypted. When used in a LAN networking environment, the digital computing subsystem 502 is connected to the LAN through an adapter or network interface card 540 (communicative linked to the system bus 510). When used in a WAN networking environment, the digital computing subsystem 502 may include an interface and modem (not shown) or other device, such as the network interface card 540, for establishing communications over the WAN/Internet.

In a networked environment, program modules, application programs, or data, or portions thereof, can be stored in the digital computing subsystem 502 for provision to the networked computers. In one embodiment, the digital computing subsystem 502 is communicatively linked through the network 538 with TCP/IP middle layer network protocols; however, other similar network protocol layers are used in other embodiments, such as user datagram protocol ("UDP"). Those skilled in the relevant art will readily recognize that the network connections shown in FIG. 5 are only some examples of establishing communications links between computers, and other links may be used, including wireless links.

While in most instances the digital computing subsystem 502 will operate automatically, where an end user application interface is provided, an operator can enter commands and information into the digital computing subsystem 502 through the end user application interface 548 including input devices, such as a keyboard 544, and a pointing device, such as a mouse 546. Other input devices can include a microphone, joystick, scanner, etc. These and other input devices are connected to the processing unit 506 through the end user application interface 520, such as a serial port interface that couples to the system bus 510, although other interfaces, such as a parallel port, a game port, or a wireless interface, or a universal serial bus ("USB") can be used. A monitor 542 or other display device is coupled to the bus 510 via a video interface, such as a video adapter (not shown). The digital computing subsystem 502 can include other output devices, such as speakers, printers, etc.

The analog computing subsystem 504 includes an analog processor, for example, a quantum processor 550. The quantum processor 550 includes multiple qubit nodes 552*a*-152*n* (collectively 552) and multiple coupling devices 554*a*-154*m* (collectively 554).

The analog computing subsystem 504 includes a readout device 556 for reading out one or more qubit nodes 552. For example, readout device 556 may include multiple dc-SQUID magnetometers, with each dc-SQUID magnetometer being inductively connected to a qubit node 552 and NIC 540 receiving a voltage or current from readout device 556. The dc-SQUID magnetometers comprise a loop of superconducting material interrupted by two Josephson junctions and are well known in the art.

The analog computing subsystem 504 also includes a qubit control system 558 including controller(s) for controlling or setting one or more parameters of some or all of the qubit nodes 552. The analog computing subsystem 504 further includes a coupling device control system 560 including coupling controller(s) for coupling devices 554. For example, each coupling controller in coupling device control system 560 may be capable of tuning the coupling strength of a coupling device 554 between a minimum and a maximum value. Coupling devices 554 may be tunable to provide ferromagnetic or anti-ferromagnetic coupling between qubit nodes 552.

Where computing system 500 includes a driver module 532, the driver module 532 may include instructions to output signals to quantum processor 550. NIC 540 may include appropriate hardware required for interfacing with qubit nodes 552 and coupling devices 554, either directly or through readout device 556, qubit control system 558, and/or coupling device control system 560. Alternatively, NIC 540 may include software and/or hardware that translate commands from driver module 532 into signals (e.g., voltages, currents, optical signals, etc.) that are directly applied to qubit nodes 552 and coupling devices 554. In another alternative, NIC 540 may include software and/or hardware that translates signals (representing a solution to a problem or some other form of feedback) from qubit nodes 552 and coupling devices 554. In some cases, analog processor interface module 530 may communicate with driver module 532 rather than directly with NIC 540 in order to send and receive signals from quantum processor 550.

The functionality of NIC 540 can be divided into two classes of functionality: data acquisition and control. Different types of chips may be used to handle each of these discrete functional classes. Data acquisition is used to measure the physical properties of qubit nodes 552 after quantum processor 550 has completed a computation. Such data can be measured using any number of customized or commercially available data acquisition micro-controllers including, but not limited to, data acquisition cards manufactured by Elan Digital Systems (Fareham, UK) including the AD132, AD136, MF232, MF236, AD142, AD218 and CF241 cards. Alternatively, data acquisition and control may be handled by a single type of microprocessor, such as the Elan D403C or D480C. There may be multiple NICs 540 in order to provide sufficient control over qubit nodes 552 and coupling devices 554 and in order to measure the results of a computation conducted on quantum processor 550.

Figure 6:
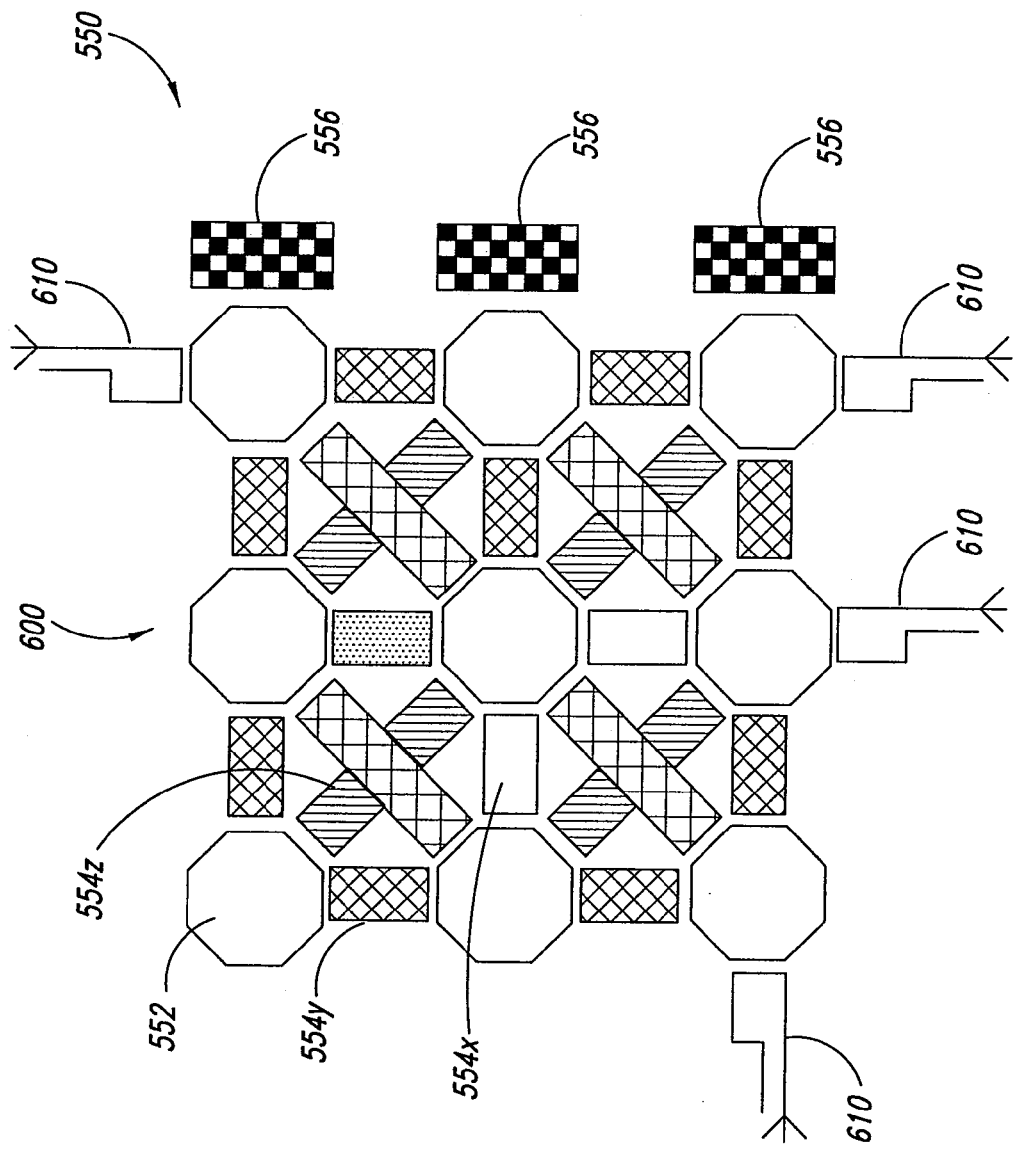
FIG. 6 is a schematic diagram showing an analog processor in the form of a quantum processor comprising a two-dimensional lattice of qubits, according to at least one illustrated embodiment of the present systems, methods and apparatus.

FIG. 6 shows an embodiment of a quantum processor 550 in the form of a two-dimensional lattice 600 of qubits 552, where at least some of the qubits 552 can be coupled to their nearest neighbors, their next-nearest neighbors, or both their nearest and next-nearest neighbors via coupling devices 554. The qubits 552 are arranged in a grid pattern and are coupled to each other by coupling devices 554. Two types of coupling devices 554 are illustrated: coupling devices 554*x*, 554*y*, arranged along primary orthogonal axes (e.g., the horizontal or vertical axes respectively in FIG. 6) of the lattice 600 and which couple qubits 552 to their nearest neighbors, and coupling devices 554*z*, arranged diagonally in lattice 600 and which couple qubits 552 to their next-nearest neighbors. Nearest neighbor qubits are those qubits that are closest in distance to an arbitrary qubit 552 in the lattice 600. Next-nearest neighbor qubits are those qubits that are closest in distance to an arbitrary qubit 552 in lattice 600 if the nearest neighbors of the arbitrary qubit 552 are removed from consideration. Those of skill in the relevant art will appreciate that the lattice 600 of the quantum processor 550 is extendable to any number of qubits 552 and coupling devices 554.

Coupling devices 554 may either couple qubits 552 together ferromagnetically or anti-ferromagnetically or not couple qubits 552 together. A ferromagnetic coupling between two qubits 552 drives the qubits 552 to have the same state, whereas an anti-ferromagnetic coupling drives the qubits 552 to have opposite states. Charge-based coupling devices 554 may also be used. More information on coupling devices 554 useful in the present systems, methods and articles can be found in U.S. patent application Ser. No. 11/247,857.

The lattice 600 may also include a set of local bias devices 610. While FIG. 6 shows four bias devices, those skilled in the art will appreciate that in some embodiments each qubit 552 in lattice 600 may have an associated bias device. Bias devices 610 provide a bias signal for qubits 552, and may provide a flux bias and/or a charge bias for the qubits 552. The lattice 600 may also include a set of readout devices 556, used to measure the state of qubits 552. Only three readout devices 556 are illustrated in FIG. 6, but any number of readout devices may be present in the lattice 600. For example, each qubit 552 in the lattice 600 may have an associated readout device, or alternatively, only qubits 552 along one or more outside edge of the lattice 600 may have an associated readout device, e.g., with the states of the interior qubits being copied to the outer qubits in order to be measured (see, for example, U.S. patent application Ser. No. 11/411,051). The interior qubits 552 of lattice 600 may have a connectivity of eight. However, those skilled in the art will appreciate that the structure of the lattice 600 is not so limited, and that lattice 600 may be arranged so that certain qubits (interior or exterior) have a different connectivity, such as 2 or 4.

The analog computing subsystem 504 may be a superconducting quantum computer, examples of which include qubit registers, readout devices and ancillary devices. Superconducting quantum computers normally are operated at millikelvin temperatures and often are operated in a dilution refrigerator. An example of a dilution refrigerator is the Leiden Cryogenics B.V. MNK 126 series (Galgewater No. 21, 2311 VZ Leiden, The Netherlands). All or part of the components of the analog computing subsystem 504 may be housed in the dilution refrigerator. For example, qubit control system 558 and coupling device control system 560 may be housed outside the dilution refrigerator with the quantum processor 550 being housed inside the dilution refrigerator.

As described herein, the present systems, methods and articles may be employed to embed an association graph into a lattice of qubits 552, such as lattice 600, with the vertices of the association graph being represented by qubits 552 and the edges of the association graph being represented by coupling devices 554. The qubits 552 and coupling devices 554 may be superconducting devices. The association graph may be based on a query graph representing the query and a database graph representing the database or portion thereof. The query corresponding to the association graph may be solved as a clique problem using the quantum processor 550. For example, the quantum processor may be evolved from a first or "initial" state to a second or "final" state, with the final state being representative of an arbitrary clique of the association graph or alternatively, a maximal clique or a maximum clique of the association graph.

Superconducting qubits useful in the present systems, methods and articles include superconducting flux qubits and superconducting charge qubits, both described in Makhlin et al., 2001, *Reviews of Modern Physics* 73, pp. 357-400. Examples of flux qubits that can be used include rf-SQUIDs, which have a superconducting loop interrupted by a Josephson junction, and persistent current qubits, which have a superconducting loop interrupted by three Josephson junctions. See Mooij et al., 1999, *Science* 285, 1036; and Orlando et al., 1999, *Phys. Rev. B* 60, 15398. Other examples of superconducting qubits can be found in Il'ichev et al., 2003, Phys. Rev. Lett. 91, 097906; Blatter et al., 2001, *Phys. Rev. B* 63, 174511; and Friedman et al., 2000, *Nature* 406, 43. In addition, hybrid charge-phase qubits may also be used, and examples of hybrid qubits can be found in U.S. Pat. No. 6,838,694 and US 2005-0082519, referred to above.

Superconducting coupling devices useful in the present systems, methods and articles include rf-SQUIDs and dc-SQUIDs, which couple qubits together by flux. As described previously, SQUIDs have a superconducting loop interrupted by one (an rf-SQUID) or two (a dc-SQUID) Josephson junctions. In some cases, the coupling devices used may be capable of both ferromagnetic and anti-ferromagnetic coupling.

The readout devices 556, may also be superconducting devices, such as a dc-SQUID, or instead, a tank circuit may be used for the readout devices 556. The readout devices 556 may read out the state of a qubit 552 in the flux regime, or alternatively, read out the state of the qubit in the charge regime. The bias devices 610 may include a loop of metal in proximity to a superconducting qubit 552 that provides an external flux bias to the qubit, and may include one or more Josephson junctions. Charge-based readout devices and charged-based local bias devices may be used.

5.5 Conclusion and References Cited

All of the U.S. patents, U.S. patent application publications, U.S. patent applications, foreign patents, foreign patent applications and non-patent publications referred to in this specification, including but not limited U.S. provisional patent application Ser. No.: 60/864,129, filed Nov. 2, 2006 and entitled "GRAPH EMBEDDING TECHNIQUES" and U.S. provisional patent application Ser. No.: 60/864,127, filed on Nov. 2, 2006, and entitled "PROCESSING RELATIONAL DATABASE PROBLEMS USING ANALOG PROCESSORS", are incorporated herein by reference, in their entirety and for all purposes.

As will be apparent to those skilled in the art, the various embodiments described above can be combined to provide further embodiments. Aspects of the present systems, methods and apparatus can be modified, if necessary, to employ systems, methods, apparatus and concepts of the various patents, applications and publications to provide yet further embodiments of the invention. These and other changes can be made to the present systems, methods and apparatus in light of the above description. In general, in the following claims, the terms used should not be construed to limit the invention to the specific embodiments disclosed in the specification and the claims, but should be construed to include all possible embodiments along with the full scope of equivalents to which such claims are entitled. Accordingly, the invention is not limited by the disclosure, but instead its scope is to be determined entirely by the following claims.

We claim:

1. A computer-implemented method of embedding a source graph into a target graph in a computing system, wherein the computing system includes a processor comprising a network of qubits and coupling devices operable to couple respective pairs of the qubits, the source graph includes a number of vertices and a number edges, wherein the edges in the source graph define relationships between pairs of the vertices in the source graph, and the target graph includes a number of vertices and a number of edges, wherein each vertex in the target graph is represented by at least one respective qubit in the computing system and each edge in the target graph is represented by at least one respective coupling device in the computing system, the method comprising:

for a first vertex in the source graph, forming a first island in the target graph, the first island comprising a first connected set of vertices in the target graph represented by a first set of qubits in the computing system, wherein forming a first island in the target graph includes controlling a first set of coupling devices to couple the first set of qubits together;

for a second vertex in the source graph, forming a second island in the target graph, the second island comprising a second connected set of vertices in the target graph represented by a second set of qubits in the computing system, wherein forming a second island in the target graph includes controlling a second set of coupling devices to couple the second set of qubits together; and for a first edge in the source graph that defines a relationship between the first vertex in the source graph and the second vertex in the source graph, forming a first inter-island bridge in the target graph, the first inter-island bridge comprising at least one inter-island edge connecting a first vertex in the first island in the target graph to a first vertex in the second island in the target graph, wherein forming a first inter-island bridge includes controlling at least one coupling device to couple at least one qubit from the first set of qubits to at least one qubit from the second set of qubits.

2. The method of claim 1 wherein the target graph is a lattice, and forming a first island in the target graph includes forming a first island in the lattice, forming a second island in the target graph includes forming a second island in the lattice, and forming a first inter-island bridge in the target graph includes forming a first inter-island bridge in the lattice.

3. The method of claim 1, further comprising:

for each of a plurality of additional vertices in the source graph, forming a respective island in the target graph, each respective island comprising a respective connected set of vertices in the target graph represented by a respective set of qubits in the computing system, and wherein forming a respective island in the target graph includes controlling a respective set of coupling devices to couple the respective set of qubits together; and for each of a plurality of additional edges in the source graph that define relationships between respective pairs of vertices in the source graph, forming a respective inter-island bridge in the target graph, each respective inter-island bridge comprising at least one respective inter-island edge connecting respective pairs of islands in the target graph together, wherein forming a respective inter-island bridge includes controlling at least one respective coupling device to couple at least two qubits from different sets together.

4. The method of claim 3 wherein the vertices in each respective island are connected via a number of intra-island edges by controlling coupling devices to couple qubits in each representative set of qubits together.

5. The method of claim 4 wherein at least one of the intra-island edges of the first island intersects with at least one of the intra-island edges of the second island.

6. The method of claim 4 wherein at least one of the intra-island edges of the first island intersects with an inter-island bridge.

7. The method of claim 4 wherein a first one of the inter-island bridges intersects with a second one of the inter-island bridges.

8. The method of claim 3 wherein forming each respective island in the target graph further comprises:

selecting at least one respective vertex in each of a plurality of rows in the target graph to represent the same vertex in the source graph, wherein each selected vertex in the target graph is represented by at least one respective selected qubit in the computing system, and wherein the respective vertices in the target graph are selected so as to maximize a total number of adjacencies between the vertices of different islands; and connecting the selected vertices in the plurality of rows in the target graph together via a number of intra-island edges by controlling a respective set of coupling devices to couple the selected qubits together.

9. The method of claim 3 wherein forming each respective island in the target graph further comprises:

selecting at least one respective vertex in each of a plurality of rows in the target graph to represent the same vertex in the source graph such that each respective pair of islands includes a respective pair of vertices that are adjacent to each other in the target graph, wherein each selected vertex in the target graph is represented by at least one respective selected qubit in the computing system; and connecting the selected vertices in the plurality of rows in the target graph together via a number of intra-island edges by controlling a respective set of coupling devices to couple the selected qubits together.

10. The method of claim 3 wherein the source graph comprises n vertices, the target graph comprises more than n vertices, and forming each respective island in the target graph includes connecting a respective set of up to n−1 target graph vertices together via intra-island edges, where n is a positive integer greater than or equal to 1.

11. The method of claim 10 wherein the target graph comprises at least n−1 rows of vertices and the target graph vertices representative of each respective island are connected together such that each row in the target graph contains no more than one target graph vertex from any given one of the islands.

12. The method of claim 10 wherein the target graph comprises at least n−1 rows of vertices and the target graph vertices representative of each respective island are connected together such that each row in the target graph contains at least one target graph vertex from each of the islands.

13. The method of claim 3 wherein each respective island in the target graph includes at least one respective qubit that is couplable to at least one respective qubit in each of the other islands via a single coupling device.

14. The method of claim 1, further comprising:

optimizing the embedding of the source graph into the target graph.

15. The method of claim 14 wherein optimizing the embedding of the source graph into the target graph includes at least one of: performing a degree-K pruning, wherein K is a positive integer; disconnecting at least one vertex from at least one of the first island and the second island; connecting at least one additional vertex to at least one of the first island and the second island; moving the first inter-island bridge from connecting the first vertex in the first island to the first vertex in the second island to connecting the first vertex in the first island to a second vertex in the second island; moving the first inter-island bridge from connecting the first vertex in the first island to the first vertex in the second island to connecting a second vertex in the first island to a second vertex in the second island; reducing at least one of a number of intra-island edges and a total number of vertices occupied in the target graph; reducing an area occupied by the target graph; executing a path finding algorithm; and/or reassigning at least one vertex from the first island to the second island.

16. The method of claim 14 wherein optimizing the embedding of the source graph into the target graph continues for a predetermined number of iterations or a predetermined period of time.

17. The method of claim 1 wherein forming a first island, a second island, and a first inter-island bridge in the target graph includes executing a path finding algorithm.

18. The method of claim 1 wherein the network of qubits is an extended grid.

19. The method of claim 1 wherein the qubits representing vertices in each of the islands are interconnected via a number of coupling devices representing intra-island edges.

* * * * *